(12) United States Patent
Miller et al.

(10) Patent No.: US 10,554,391 B2
(45) Date of Patent: Feb. 4, 2020

(54) TECHNOLOGIES FOR DYNAMICALLY ALLOCATING DATA STORAGE CAPACITY FOR DIFFERENT DATA STORAGE TYPES

(71) Applicant: Intel Corporation, Santa Clara, CA (US)

(72) Inventors: Steven Miller, Livermore, CA (US); Paul Dormitzer, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 44 days.

(21) Appl. No.: 15/856,220

(22) Filed: Dec. 28, 2017

(65) Prior Publication Data

US 2019/0034102 A1    Jan. 31, 2019

Related U.S. Application Data

(60) Provisional application No. 62/584,401, filed on Nov. 10, 2017.

(30) Foreign Application Priority Data

Aug. 30, 2017  (IN) .............................. 201741030632

(51) Int. Cl.
*G06F 12/00* (2006.01)
*H04L 9/08* (2006.01)
(Continued)

(52) U.S. Cl.
CPC .......... *H04L 9/0819* (2013.01); *G06F 3/0604* (2013.01); *G06F 3/0605* (2013.01); *G06F 3/065* (2013.01); *G06F 3/067* (2013.01); *G06F 3/0611* (2013.01); *G06F 3/0613* (2013.01); *G06F 3/0629* (2013.01); *G06F 3/0631* (2013.01); *G06F 3/0632* (2013.01); *G06F 3/0644* (2013.01); *G06F 3/0647* (2013.01); *G06F 3/0659* (2013.01); *G06F 3/0673* (2013.01); *G06F 3/0683* (2013.01); *G06F 3/0685* (2013.01); *G06F 9/28* (2013.01); *G06F 9/445* (2013.01); *G06F 9/4406* (2013.01); *G06F 9/4411* (2013.01); *G06F 9/4494* (2018.02);
(Continued)

(58) Field of Classification Search
CPC .............................. G06F 3/0605; G06F 12/06
USPC ........................................................ 711/171
See application file for complete search history.

(56) References Cited

U.S. PATENT DOCUMENTS

| 7,574,623 B1 * | 8/2009 | Goel ..................... G06F 11/008 714/47.2 |
| 2001/0049774 A1 * | 12/2001 | Otterness .............. G06F 3/0613 711/148 |

* cited by examiner

*Primary Examiner* — Jae U Yu
(74) *Attorney, Agent, or Firm* — Barnes & Thornburg LLP

(57) ABSTRACT

Technologies for allocating data storage capacity on a data storage sled include a plurality of data storage devices communicatively coupled to a plurality of network switches through a plurality of physical network connections and a data storage controller connected to the plurality of data storage devices. The data storage controller is to determine a target storage resource allocation to be used by one or more applications to be executed by one or more sleds in a data center, determine data storage capacity available for each of a plurality of different data storage types on the data storage sled, wherein each data storage type is associated with a different level of data redundancy, determine an amount of data storage capacity for each data storage type to be allocated to satisfy the target storage resource allocation, and adjust the amount of data storage capacity allocated to each data storage type.

25 Claims, 20 Drawing Sheets

(51) Int. Cl.
*G06F 3/06* (2006.01)
*G06F 9/50* (2006.01)
*H04L 29/06* (2006.01)
*H04L 29/08* (2006.01)
*G06F 16/25* (2019.01)
*G06F 16/2453* (2019.01)
*H04L 12/861* (2013.01)
*G11C 8/12* (2006.01)
*G11C 29/02* (2006.01)
*H04L 12/24* (2006.01)
*G11C 29/36* (2006.01)
*G11C 29/38* (2006.01)
*G11C 29/44* (2006.01)
*G06F 16/22* (2019.01)
*G06F 16/2455* (2019.01)
*G06F 12/02* (2006.01)
*G06F 12/14* (2006.01)
*G06F 13/16* (2006.01)
*G06F 15/173* (2006.01)
*G06F 13/40* (2006.01)
*G06F 13/42* (2006.01)
*G06F 9/448* (2018.01)
*G06F 9/28* (2006.01)
*G06F 15/16* (2006.01)
*H04L 12/703* (2013.01)
*H04L 12/743* (2013.01)
*H04L 12/801* (2013.01)
*H04L 12/803* (2013.01)
*H04L 12/935* (2013.01)
*H04L 12/931* (2013.01)
*G06F 9/4401* (2018.01)
*G06F 9/445* (2018.01)
*G06F 12/06* (2006.01)
*G06F 16/23* (2019.01)
*G06F 16/248* (2019.01)
*G06F 16/901* (2019.01)
*G06F 16/11* (2019.01)
*G06F 12/0802* (2016.01)
*G06F 12/1045* (2016.01)

(52) U.S. Cl.
CPC .......... *G06F 9/5044* (2013.01); *G06F 9/5088* (2013.01); *G06F 12/023* (2013.01); *G06F 12/06* (2013.01); *G06F 12/0607* (2013.01); *G06F 12/14* (2013.01); *G06F 13/1663* (2013.01); *G06F 13/1668* (2013.01); *G06F 13/4068* (2013.01); *G06F 13/42* (2013.01); *G06F 15/161* (2013.01); *G06F 15/17331* (2013.01); *G06F 16/119* (2019.01); *G06F 16/221* (2019.01); *G06F 16/2237* (2019.01); *G06F 16/2255* (2019.01); *G06F 16/2282* (2019.01); *G06F 16/2365* (2019.01); *G06F 16/248* (2019.01); *G06F 16/2453* (2019.01); *G06F 16/2455* (2019.01); *G06F 16/24553* (2019.01); *G06F 16/25* (2019.01); *G06F 16/9014* (2019.01); *G11C 8/12* (2013.01); *G11C 29/028* (2013.01); *G11C 29/36* (2013.01); *G11C 29/38* (2013.01); *G11C 29/44* (2013.01); *H04L 9/0894* (2013.01); *H04L 41/0213* (2013.01); *H04L 41/0668* (2013.01); *H04L 41/0677* (2013.01); *H04L 41/0893* (2013.01); *H04L 41/0896* (2013.01); *H04L 45/28* (2013.01); *H04L 45/7453* (2013.01); *H04L 47/11* (2013.01); *H04L 47/125* (2013.01); *H04L 49/30* (2013.01); *H04L 49/351* (2013.01); *H04L 49/9005* (2013.01); *H04L 69/12* (2013.01); *H04L 69/22* (2013.01); *H04L 69/32* (2013.01); *H04L 69/321* (2013.01); *G06F 12/0802* (2013.01); *G06F 12/1054* (2013.01); *G06F 12/1063* (2013.01); *G06F 2201/85* (2013.01); *G06F 2209/509* (2013.01); *G06F 2212/1044* (2013.01); *G06F 2212/1052* (2013.01); *G06F 2212/601* (2013.01); *G06F 2213/0064* (2013.01)

TECHNOLOGIES FOR DYNAMICALLY ALLOCATING DATA STORAGE CAPACITY FOR DIFFERENT DATA STORAGE TYPES

CROSS-REFERENCE TO RELATED APPLICATIONS

The present application claims the benefit of Indian Provisional Patent Application No. 201741030632, filed Aug. 30, 2017 and U.S. Provisional Patent Application No. 62/584,401, filed Nov. 10, 2017.

BACKGROUND

In a typical cloud-based computing environment (e.g., a data center), multiple compute devices may execute workloads (e.g., processes, applications, services, etc.) on behalf of customers. During the execution of the workloads, the amount of data storage capacity to be used for ephemeral data (e.g., cache or other data temporarily used by an application to perform operations) and durable data (e.g., stable or archival data) varies with the number and types of workloads executed by each compute device.

Typically, such data is stored in one or more data storage devices, such as in one or more solid state drives (SSD), hard disk drives (HDD), or other data storage device and may be addressable in blocks (e.g., sets of bytes). To guard against the possibility of having inadequate data storage for the ephemeral and durable data storage need of the workloads, each data storage device is typically equipped with a fixed amount of data storage capacity for each data storage type to meet the peak amount that may occasionally be requested by the workloads. However, given the variations in the ephemeral and durable data storage needs of the workloads as they are executed, the capacity of the data storage devices may go unused for a significant percentage of the time, resulting in wasted resources in the data center.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
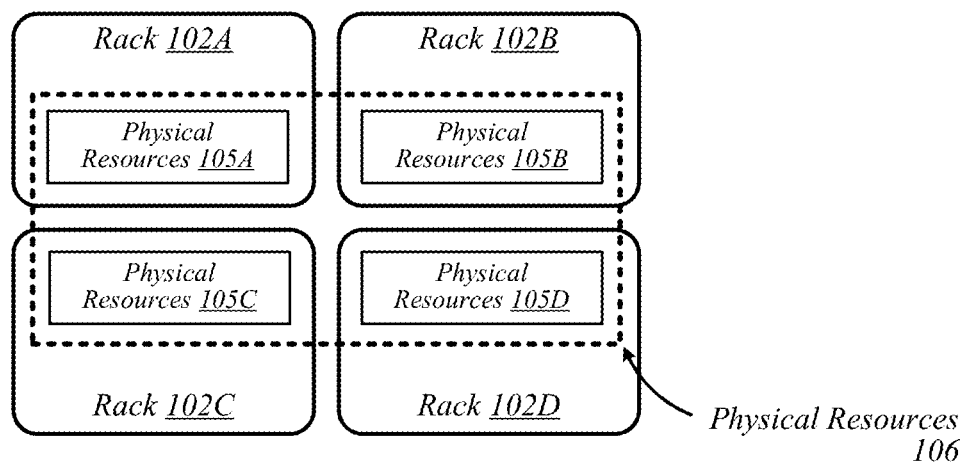
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
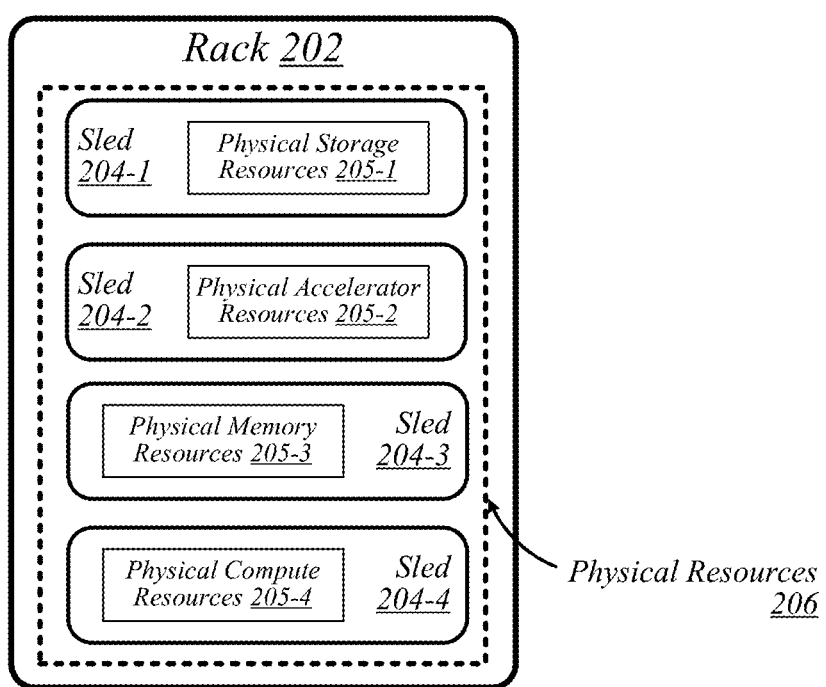
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-4 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
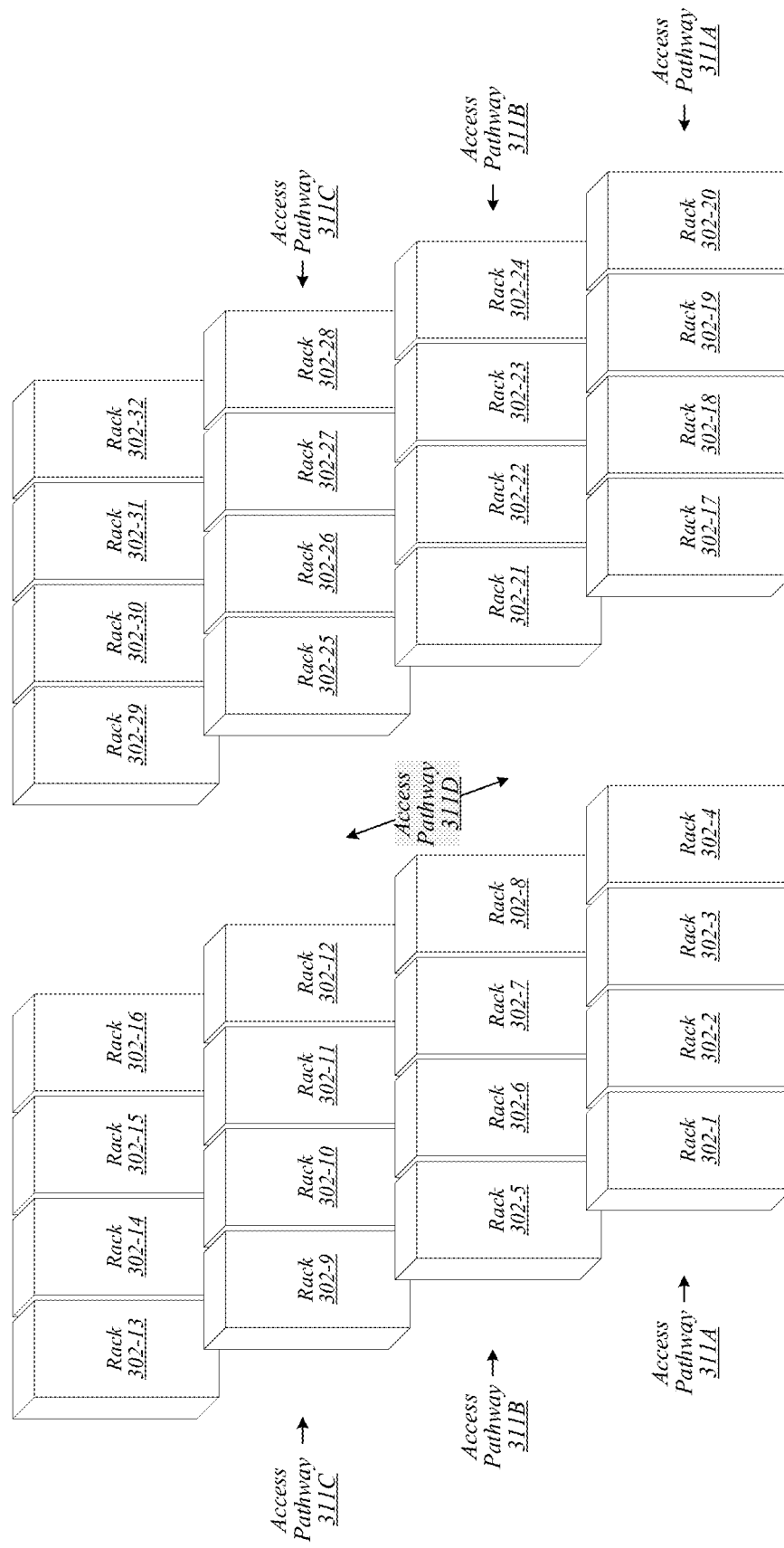
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
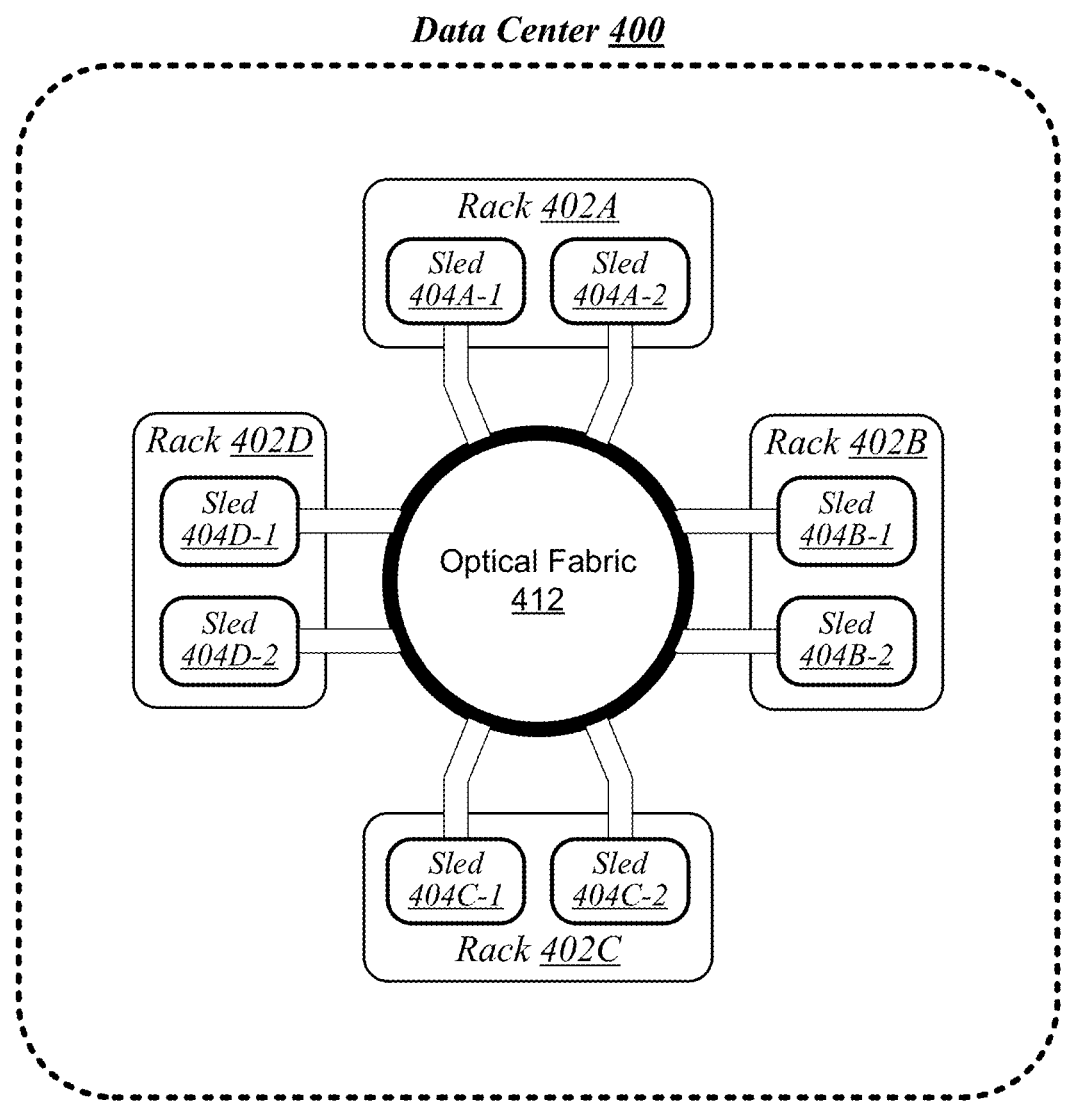
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
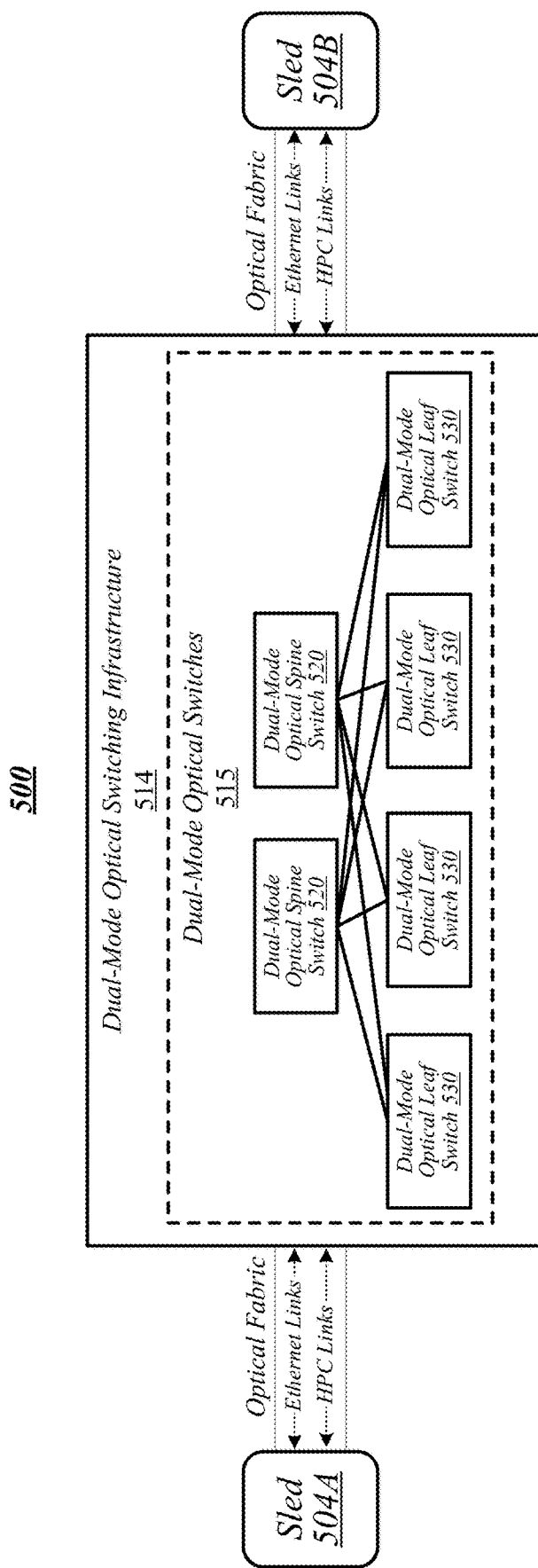
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, InfiniBand™) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
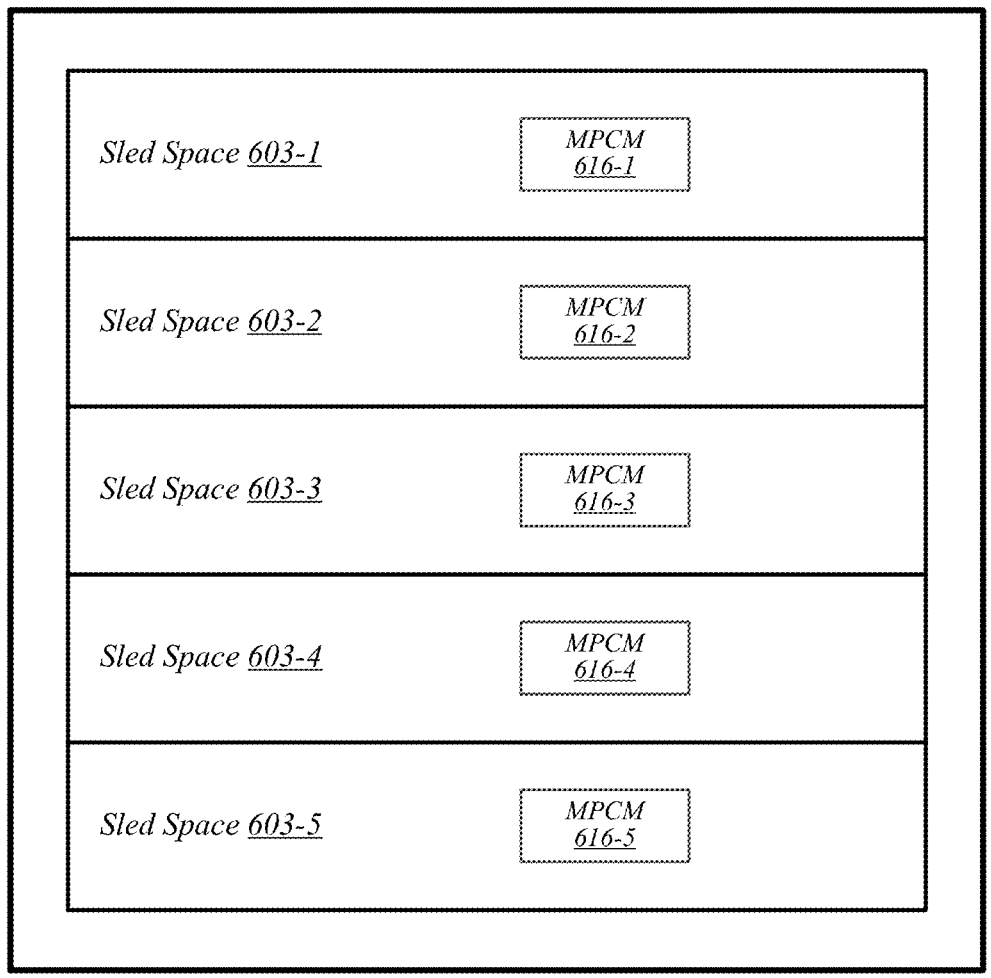
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
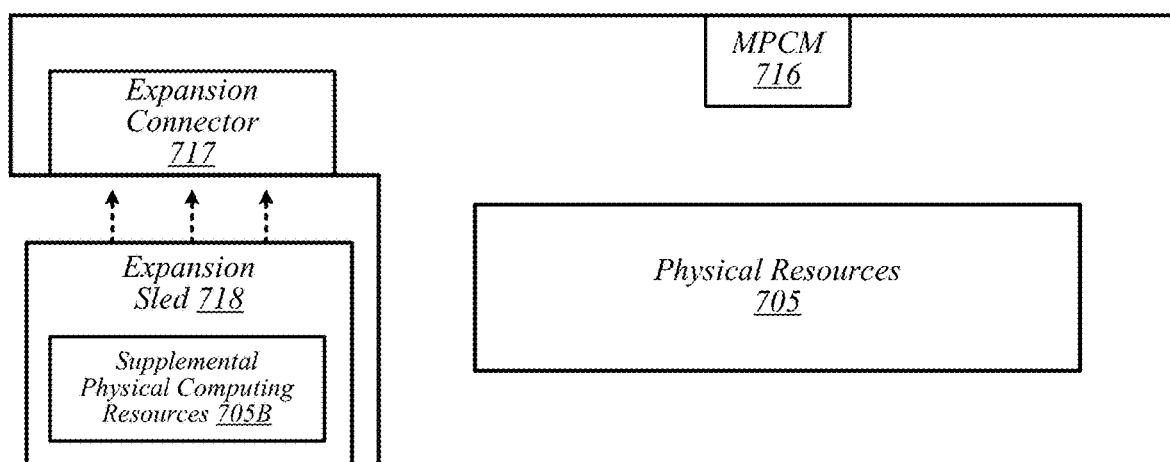
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
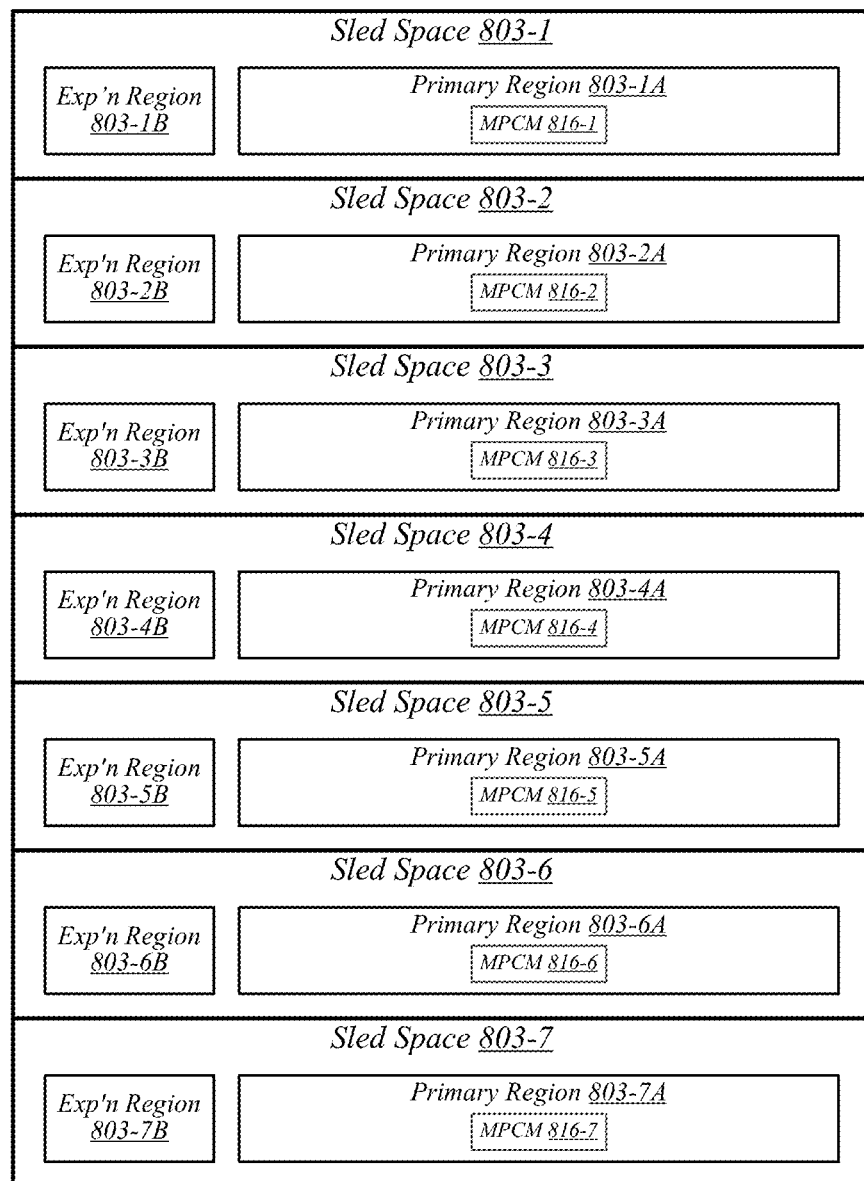
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
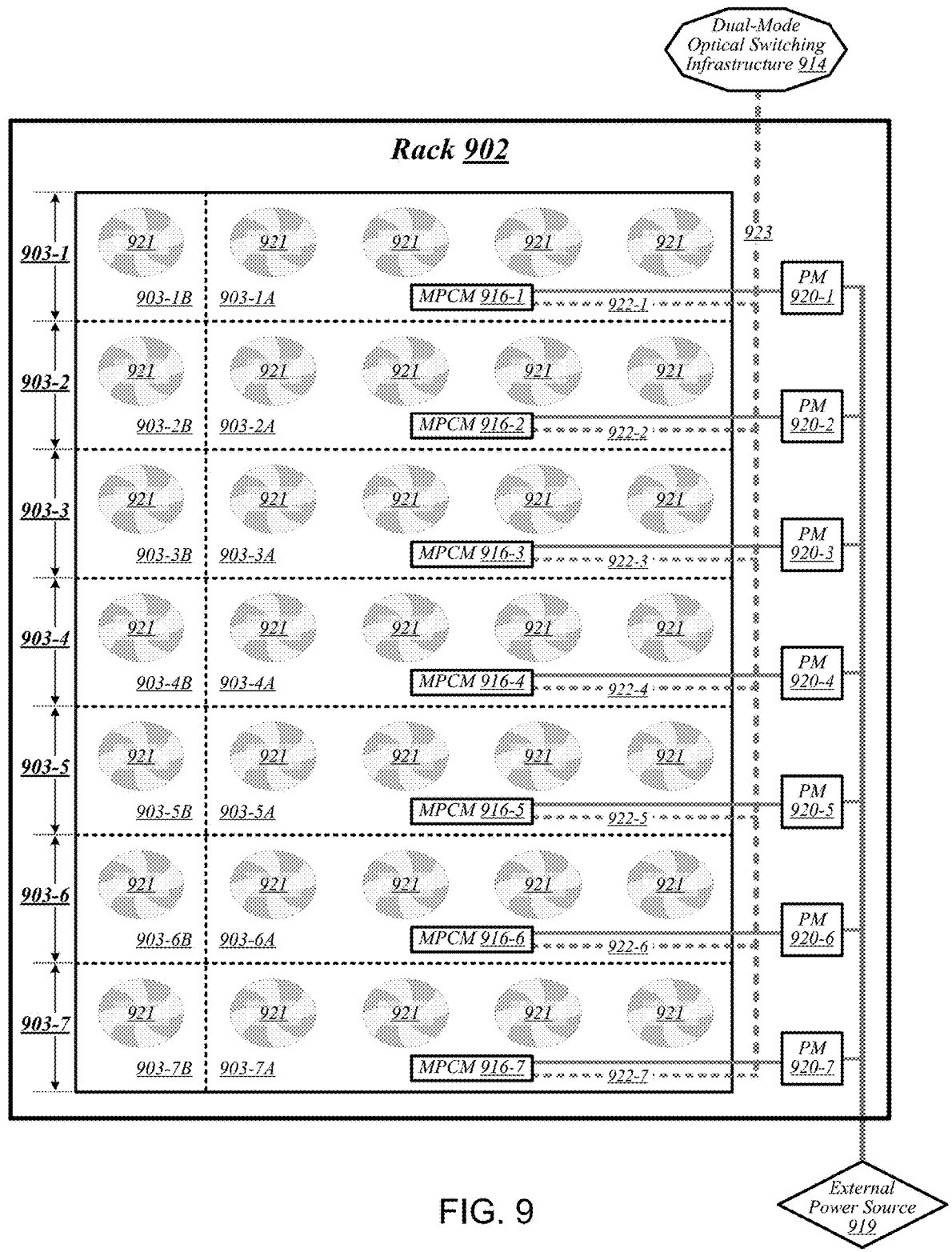
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 921 that are generally arranged to provide air cooling within the various sled spaces 903-1 to 903-7. In some embodiments, the height of the sled space is greater than the conventional "1U" server height. In such embodiments, fans 921 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 919. In various embodiments, external power source 919 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
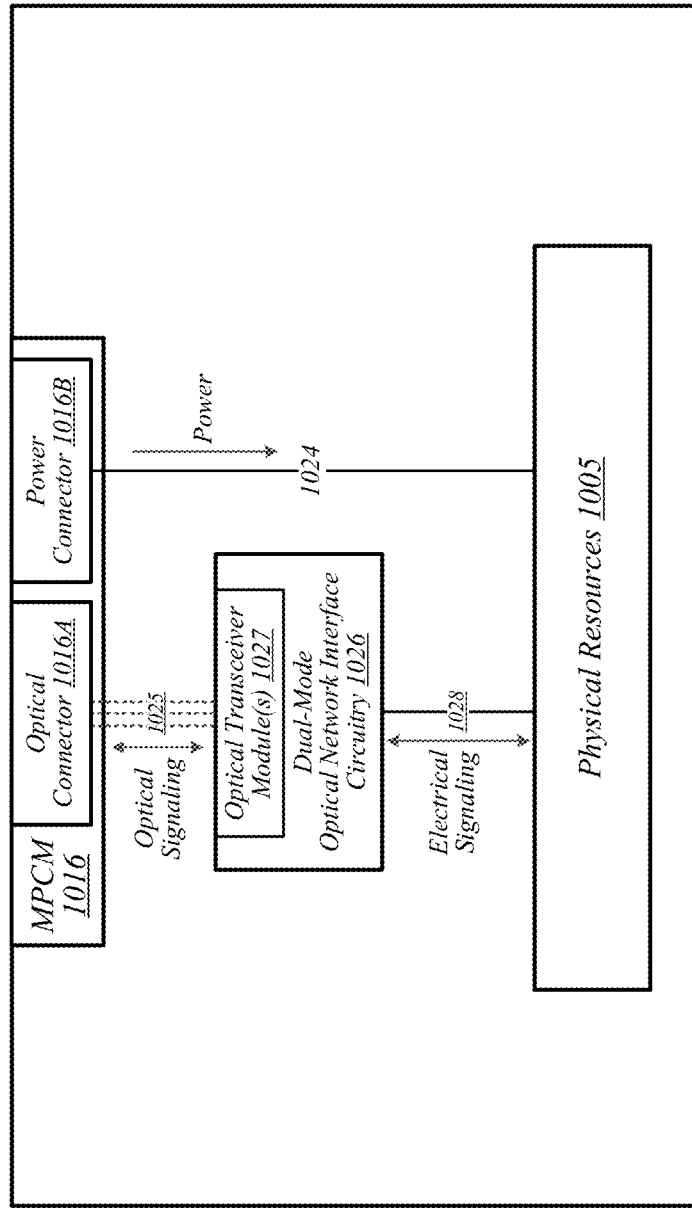
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
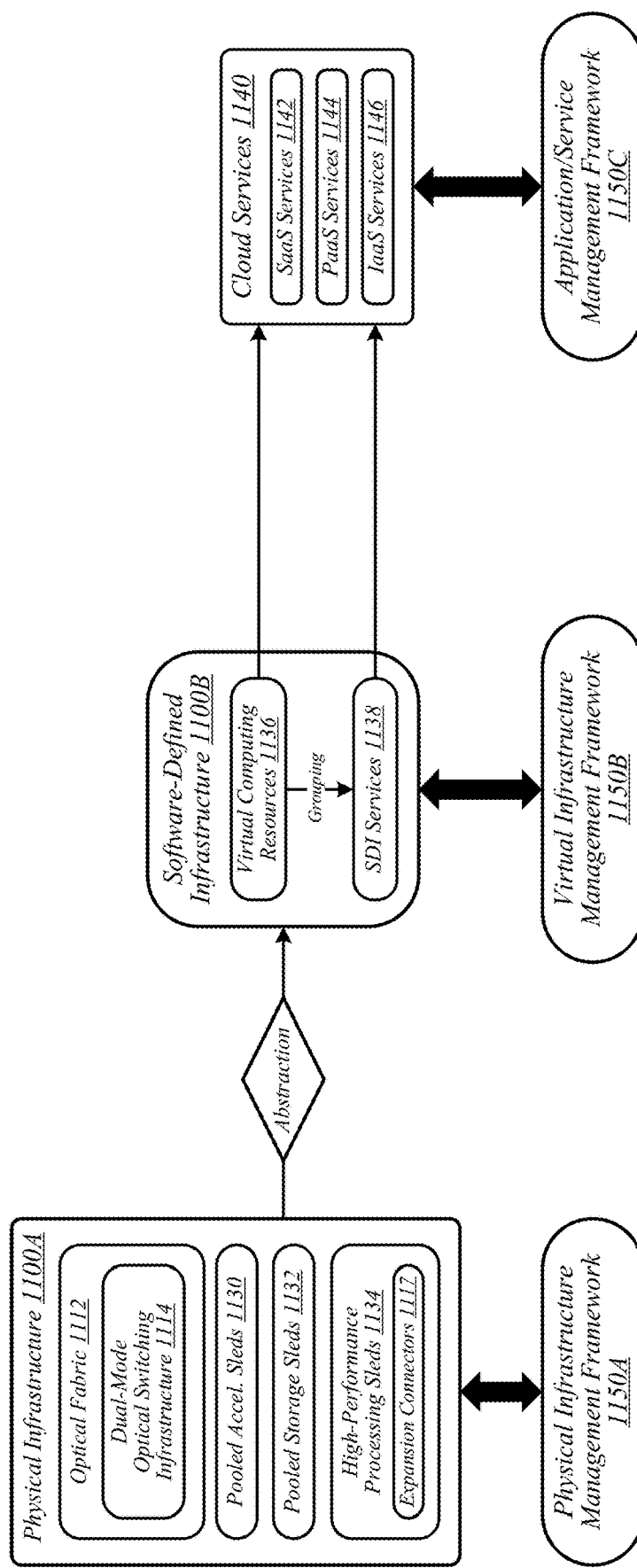
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to— optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of software-defined infrastructure (SDI) services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
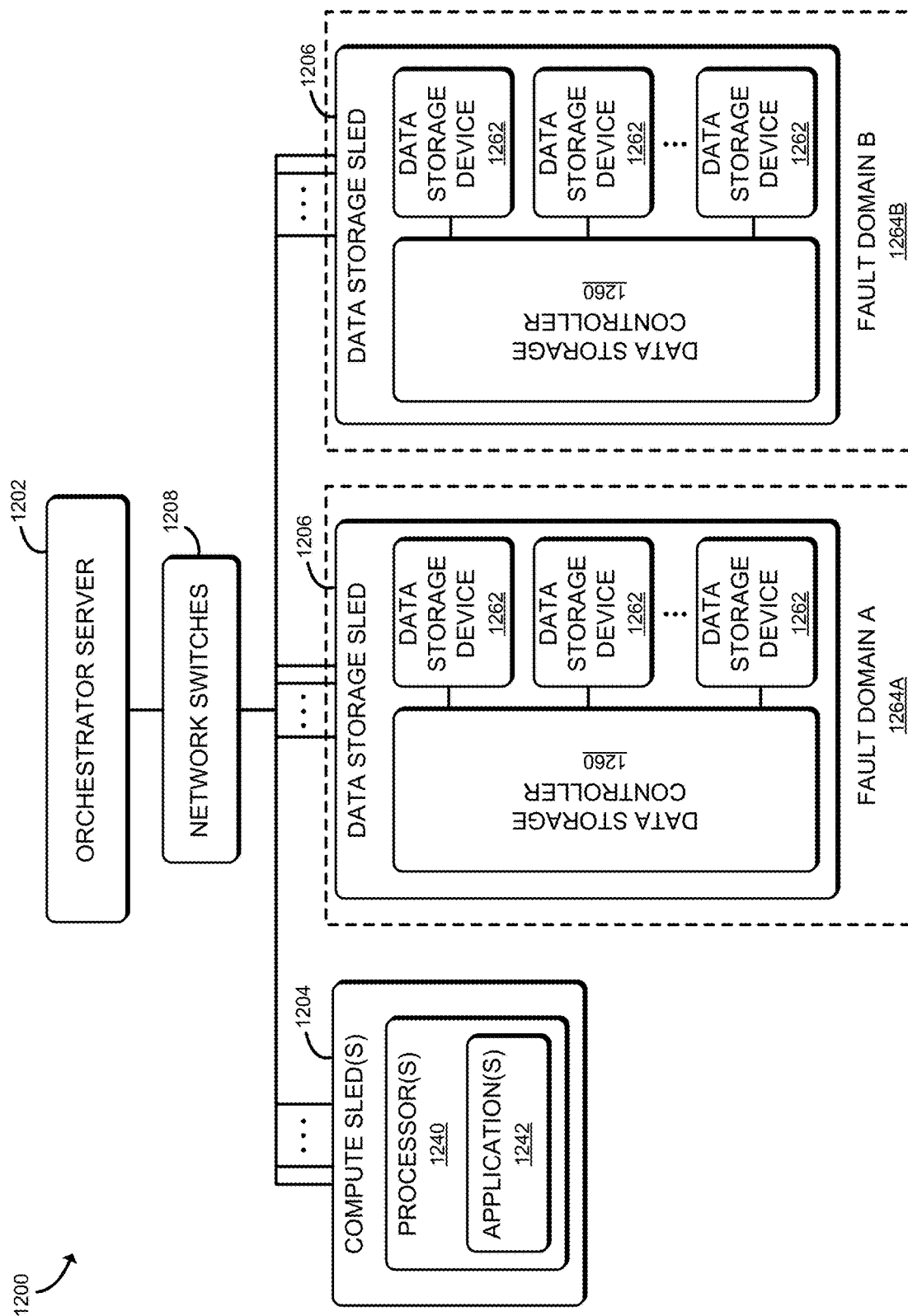
FIG. 12 is a simplified block diagram of at least one embodiment of a system for allocating data storage capacity for different data storage types.

Referring now to FIG. 12, a system 1200, which may be implemented in accordance with the data centers 100, 300, 400, 1100 described above with reference to FIGS. 1, 3, 4, and 11, for allocating data storage capacity for different data storage types includes an orchestrator server 1202 in communication with one or more compute sleds 1204 (e.g., physical compute resources 205-4) and a plurality of data storage sleds 1206 (e.g., physical storage resources 205-1) from the same or different racks (e.g., one or more of racks 302-1 through 302-32) via a plurality of network switches 1208. It should be understood that in other embodiments, the system 1200 may include a different number of the compute sleds 1204, the data storage sleds 1206, and/or other sleds (e.g., memory sleds or accelerator sleds) from the same or different racks (e.g., one or more of racks 302-1 through 302-32) in a data center. The system 1200 may be located in the data center and provide storage and compute services (e.g., cloud services) to a client device (not shown) that is in communication with the system 1200 through a network (not shown). The orchestrator server 1202 may support a cloud operating environment, such as OpenStack, and each of the compute sleds 1204 may execute one or more applications or processes (i.e., workloads), such as in virtual machines or containers, on behalf of a user of the client device.

In use, as described in more detail below, each data storage sled 1206 may selectively allocate data storage capacity of data storage devices 1262 of the corresponding data storage sled 1206 for each of a plurality of different data storage types based on a target storage resource allocation. The different data storage types correspond to different levels of redundancy of data. For example, the different data storage types may include ephemeral data storage and durable data storage. The ephemeral data storage may be embodied as temporary data storage, such as swap space, that is isolated on a single point of failure. In contrast, the durable data storage may be embodied as data storage that is distributed across multiple points of failure through replication and erasure coding. It should be appreciated that the target storage resource allocation may be determined based on one or more applications 1242 to be executed by the one or more compute sleds 1204. As such, as requirements of the applications 1242 executed in the data center change, the data storage sleds 1206 may adjust the amount of data storage capacity allocated to each of the ephemeral and durable data storage. Additionally or alternatively, in some embodiment, each data storage sled 1206 may receive data storage capacity allocation data indicative of an allocation of an amount of data storage capacity for each of the ephemeral and durable data storage on the corresponding data storage sled 1206 from the orchestrator server 1202. In such embodiments, the orchestrator server 1202 may communicate with the plurality of data storage sleds 1206 to coordinate the allocation of the amount of data storage capacity for different data storage types among the plurality of data storage sleds 1206 based on an amount of data storage capacity available on each data storage sled 1206.

Moreover, as shown in FIG. 12, the compute sled 1204 executing one or more applications 1242 is configured to access data storage devices 1262 on the data storage sleds 1206 through the network switches 1208 connecting the compute sled 1204 to one or more data storage sleds 1206. Unlike typical systems in which each rack of servers represents a single point of failure (e.g., through a top of rack switch that may become inoperative), in the illustrative embodiment, each data storage sled 1206 is separately connected to multiple network switches 1208 via multiple connections and, as such, operates as its own fault domain 1264. Accordingly, if one data storage sled 1206 becomes inoperative in a rack, the other data storage sleds 1206 remain operative; thereby improving reliability of the data storage in the data center.

It should be appreciated that the orchestrator server 1202, one or more compute sleds 1204, and one or more data storage sleds 1206 may communicate via a network, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (Wi-MAX), etc.), digital subscriber line (DSL) networks, cable networks (e.g., coaxial networks, fiber networks, etc.), or any combination thereof.

Figure 13:
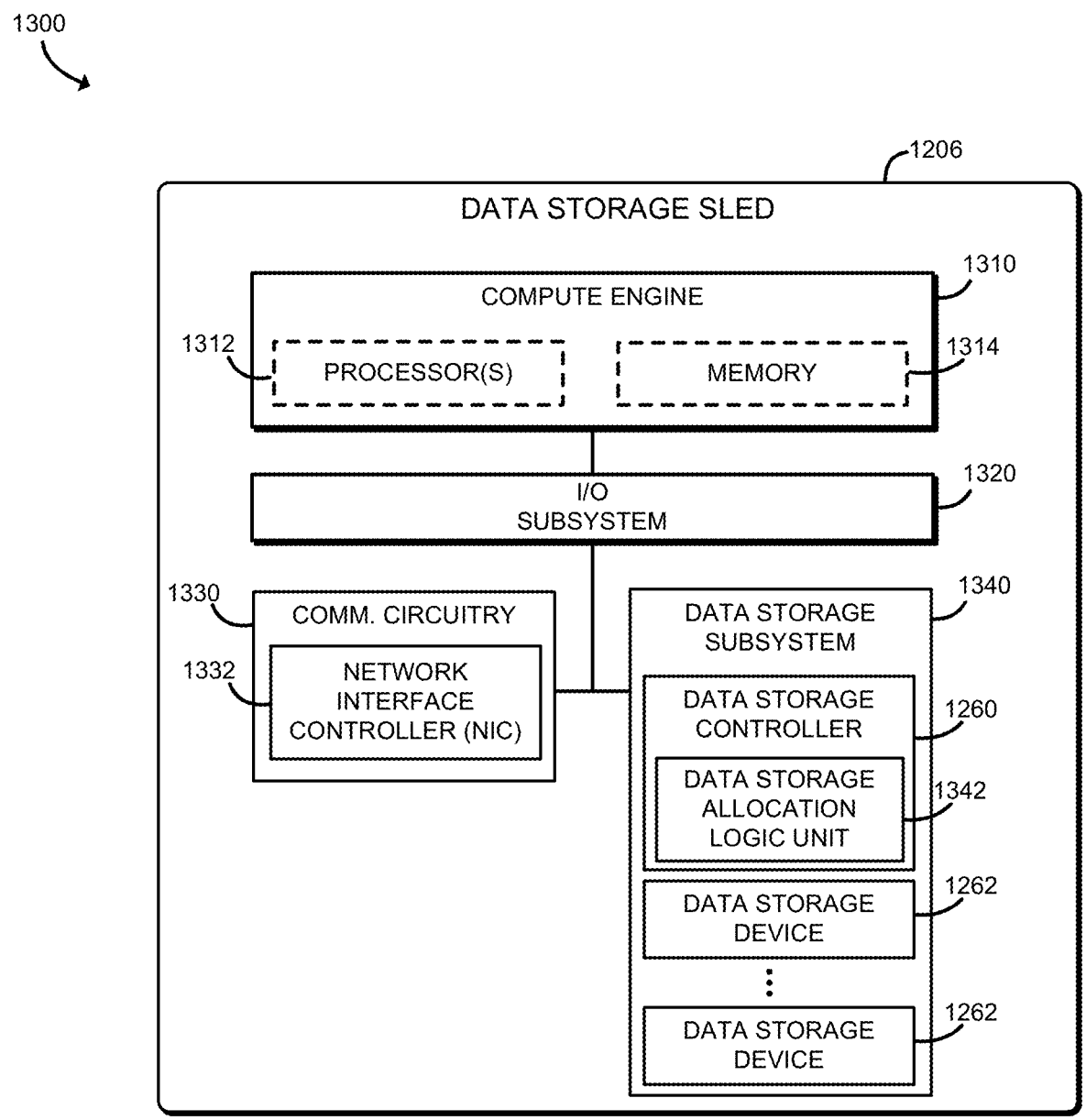
FIG. 13 is a simplified block diagram of a data storage sled of FIG. 12.

Referring now to FIG. 13, the data storage sled 1206 may be embodied as any type of compute device capable of performing the functions described herein, including determining a target storage resource allocation to be used by one or more applications executed by one or more compute sleds 1204 in a data center, determining data storage capacity available for each data storage type on the data storage sled 1206, determining an amount of data storage capacity for each data storage type to be allocated to satisfy the target storage resource allocation, and adjusting the amount of data storage capacity allocated to each data storage type. For example, the data storage sled 1206 may be embodied as a computer, a distributed computing system, one or more sleds (e.g., the sleds 204-1, 204-2, 204-3, 204-4, etc.), a server (e.g., stand-alone, rack-mounted, blade, etc.), a multiprocessor system, a network appliance (e.g., physical or virtual), a desktop computer, a workstation, a laptop computer, a notebook computer, a processor-based system, or a network appliance. As shown in FIG. 13, the illustrative data storage sled 1206 includes a compute engine 1310, an input/output (I/O) subsystem 1320, communication circuitry 1330, and a data storage subsystem 1340. The compute engine 1310 further includes one or more processors 1312 and a memory 1314, and the communication circuitry 1330 further includes a network interface controller (NIC) 1332. Additionally, the data storage subsystem 1340 further includes the data storage controller 1260, a data storage allocation logic unit 1342, and a plurality of data storage devices 1262. It should be appreciate that, in other embodiments, the data storage sled 1206 may include other or additional components, such as those commonly found in a computer (e.g., display, peripheral devices, etc.). Additionally, in some embodiments, one or more of the illustrative components may be incorporated in, or otherwise form a portion of, another component.

The compute engine 1310 may be embodied as any type of device or collection of devices capable of performing various compute functions described below. In some embodiments, the compute engine 1310 may be embodied as a single device such as an integrated circuit, an embedded system, a field-programmable gate array (FPGA), a system-on-a-chip (SoC), or other integrated system or device. In the illustrative embodiment, the compute engine 1310 includes or is embodied as a processor 1312 and a memory 1314. The processor 1312 may be embodied as any type of processor capable of performing the functions described herein. For example, the processor 1312 may be embodied as a single or multi-core processor(s), a microcontroller, or other processor or processing/controlling circuit. In some embodiments, the processor 1312 may be embodied as, include, or be coupled to a field programmable gate array (FPGA), an application specific integrated circuit (ASIC), reconfigurable hardware or hardware circuitry, or other specialized hardware to facilitate performance of the functions described herein.

The memory 1314 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, DNA-based media, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 1314 may be integrated into the processor 1312. In operation, the memory 1314 may store various software and data used during operation such as resource utilization data, resource availability data, application programming interface (API) data, applications, programs, and libraries.

The compute engine 1310 is communicatively coupled to the orchestrator server 1202, the compute sleds 1204, and other data storage sled(s) 1206 via the I/O subsystem 1320, which may be embodied as circuitry and/or components to facilitate input/output operations with the compute engine 1310 (e.g., with the processor 1312 and/or the memory 1314) and other components of the data storage sled 1206. For example, the I/O subsystem 1320 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1320 may form a portion of a system-on-a-chip (SoC) and be incorporated, along with one or more of the processor 1312, the memory 1314, and other components of the data storage sled 1206, into the compute engine 1310.

The communication circuitry 1330 may be embodied as any communication circuit, device, or collection thereof, capable of enabling communications between the data storage sled 1206 and another compute device (e.g., the compute sled(s) 1204, other data storage sled(s) 1206, and the orchestrator server 1202). The communication circuitry 1330 may be configured to use any one or more communication technology (e.g., wired or wireless communications) and associated protocols (e.g., Ethernet, Bluetooth®, Wi-Fi®, WiMAX, etc.) to effect such communication. The communication circuitry 1330 may include a network interface controller (NIC) 1332 (e.g., as an add-in device), which may also be referred to as a host fabric interface (HFI). The NIC 1332 may be embodied as one or more add-in-boards, daughter cards, network interface cards, controller chips, chipsets, or other devices that may be used by the data storage sled 1206 to connect with another compute device (e.g., the compute sled(s) 1204, other data storage sled(s) 1206, and the orchestrator server 1202). In some embodiments, the NIC 1332 may be embodied as part of a system-on-a-chip (SoC) that includes one or more processors, or included on a multichip package that also contains one or more processors. In some embodiments, the NIC 1332 may include a local processor (not shown) and/or a local memory (not shown) that are both local to the NIC 1332. In such embodiments, the local processor of the NIC 1332 may be capable of performing one or more of the functions of the compute engine 1310 described herein. Additionally or alternatively, in such embodiments, the local memory of the NIC 1332 may be integrated into one or more components of the data storage sled 1206 at the board level, socket level, chip level, and/or other levels.

As described above, the data storage subsystem 1340 includes the data storage controller 1260 and the data storage devices 1262. The data storage controller 1260 may be embodied as any type of circuit, device, or collection thereof (e.g., a processor, an ASIC, an FPGA, etc.), capable of managing allocation of data storage capacity of the corresponding data storage sled 1206 for each of different data storage types. The data storage controller 1260 may further include the data storage allocation logic unit 1342, which may be embodied as any circuit, device, or collection thereof (e.g., a processor, an ASIC, an FPGA, etc.), capable of determining data storage capacity available for each of different data storage types on the data storage sled 1206, determining an amount of data storage capacity for each data storage type to be allocated to satisfy the target storage resource allocation, and adjusting the amount of data storage capacity allocated to each data storage type on the data storage sled 1206.

The illustrative data storage devices 1262 may be embodied as any type of devices configured for short-term or long-term storage of data such as, for example, memory devices and circuits, memory cards, hard disk drives, solid-state drives, or other data storage devices. Each data storage device 1262 may include a system partition that stores data and firmware code for the data storage device 1262. Each data storage device 1262 may also include one or more operating system partitions that store data files and executables for operating systems.

The orchestrator server 1202 and the compute sleds 1204 may have components similar to those described in FIG. 13. The description of those components of the data storage sled 1206 is equally applicable to the description of components of those devices and is not repeated herein for clarity of the description. Further, it should be appreciated that any of the data storage sled 1206, the compute sled 1204, and the orchestrator server 1202 may include other components, sub-components, and devices commonly found in a computing device, which are not discussed above in reference to the data storage sled 1206 and not discussed herein for clarity of the description.

As described above, the orchestrator server 1202 and the sleds 1204, 1206 are illustratively in communication via a network, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 14:
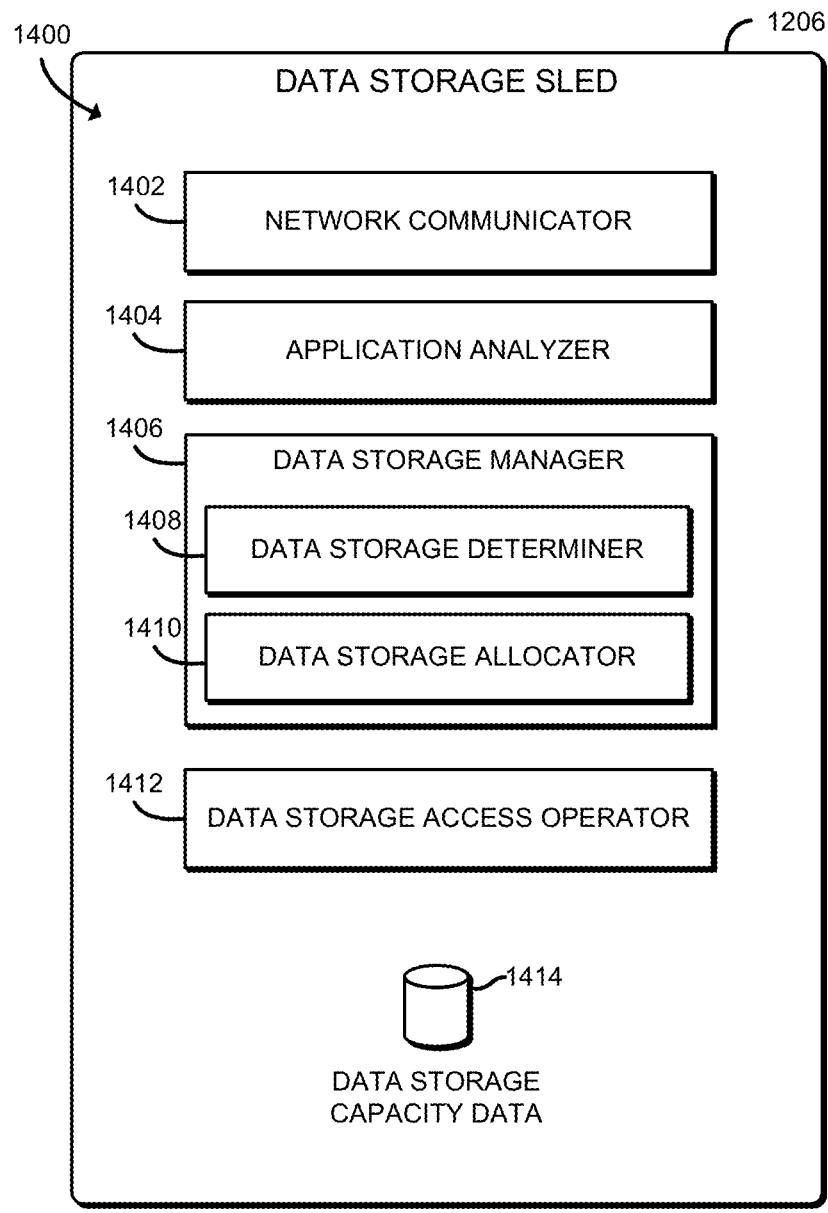
FIG. 14 is a simplified block diagram of at least one embodiment of an environment that may be established by the data storage sled of FIGS. 12 and 13.

Referring now to FIG. 14, in the illustrative embodiment, the data storage sled 1206 may establish an environment 1400 during operation. The illustrative environment 1400 includes a network communicator 1402, an application analyzer 1404, a data storage manager 1406, and a data storage access operator 1412. The data storage manager 1406 further includes a data storage determiner 1408 and a data storage allocator 1410. Each of the components of the environment 1400 may be embodied as hardware, firmware, software, or a combination thereof. As such, in some embodiments, one or more of the components of the environment 1400 may be embodied as circuitry or a collection of electrical devices (e.g., network communicator circuitry 1402, application analyzer circuitry 1404, data storage manager circuitry 1406, data storage determiner circuitry 1408, data storage allocator circuitry 1410, data storage access operator circuitry 1412, etc.). It should be appreciated that, in such embodiments, one or more of the network communicator circuitry 1402, the application analyzer circuitry 1404, the data storage manager circuitry 1406, the data storage determiner circuitry 1408, the data storage allocator circuitry 1410, and/or the data storage access operator circuitry 1412 may form a portion of one or more of the compute engine 1310, the I/O subsystem 1320, the communication circuitry 1330, the data storage subsystem 1340, and/or other components of the data storage sled 1206. In the illustrative embodiment, the environment 1400 includes data storage capacity data 1414 which may be embodied as any data indicative of the availability of storage data capacity for different data storage types, such as amounts of available ephemeral data storage and durable data storage. The different types of data storage devices to provide the different types of ephemeral data storage may be solid state drives (SSDs), hard disk drives (HDDs), dual in-line memory modules, and/or other memory devices.

In the illustrative environment 1400, the network communicator 1402, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the data storage sled 1206, respectively. To do so, the network communicator 1402 is configured to receive and process data packets from one system or computing device (e.g., the compute sleds 1204, the orchestrator server 1202, or other data storage sled 1206 in the data center) and to prepare and send data packets to another computing device or system (e.g., the compute sleds 1204, the orchestrator server 1202, or other data storage sled 1206 in the data center). In the illustrative embodiment, the network communicator 1402 is configured to receive one or more storage requests from one or more applications 1242 that are to be executed by one or more compute sleds 1204 in the data center. As described further below, the storage request may be used to determine a target storage resource allocation. Additionally, the network communicator 1402 is configured to receive one or more data storage access requests from one or more applications 1242 that are being executed by the one or more compute sleds 1204. As described further below, the data storage access request includes a type of data storage access operation requested to be performed and a data storage type, which is to be accessed to perform the requested data storage access operation. Accordingly, in some embodiments, at least a portion of the functionality of the network communicator 1402 may be performed by the communication circuitry 1330, and, in the illustrative embodiment, by the NIC 1332.

The application analyzer 1404, which may be embodied as hardware, firmware, software, virtualized hardware, emulated architecture, and/or a combination thereof as discussed above, is configured to analyze one or more storage requests received from one or more applications 1242 that are to be executed by one or more compute sleds 1204 to determine a target storage resource allocation. For example, the storage request may include a service level agreement (SLA) that may indicate target quality of service (QoS) metrics associated with the corresponding application 1242 (e.g., a target utilization level, a target throughput and/or latency, a target reliability and capacity). Additionally, the application analyzer 1404 may determine a type of application 1242 to determine the amount of data storage capacity required for each of the data storage types to execute the corresponding application 1242. For example, the application or workload may include a set of instructions for performing a database function, a data compression or decompression function, a cryptographic function, and/or other functions that may affect the amount of data storage capacity required for different data storage types.

The data storage manager 1406, which may be embodied as hardware, firmware, software, virtualized hardware, emulated architecture, and/or a combination thereof as discussed above, is configured to manage allocation of data storage capacity of the corresponding data storage sled 1206 for each of the plurality of different data storage types. To do so, the data storage manager 1406 further includes the data storage determiner 1408 and the data storage allocator 1410. The data storage determiner 1408, in the illustrative embodiment, is configured to determine data storage capacity available for each of the plurality of different data storage types on the data storage sled 1206 and determine an amount of data storage capacity for each data storage type to be allocated to satisfy the target storage resource allocation.

The data storage allocator 1410, in the illustrative embodiment, is configured to adjust the amount of data storage capacity allocated to each data storage type on the data storage sled 1206. The data storage allocator 1410, in operation, may then send a message back to the compute sled 1204 that sent the storage request with information about the allocated ephemeral data storage and durable data storage, including the amount of allocated storage for each data storage type, the addresses of the blocks of each data storage type, and the type (e.g., performance characteristics) of the allocated data storage type.

The data storage access operator 1412, which may be embodied as hardware, firmware, software, virtualized hardware, emulated architecture, and/or a combination thereof as discussed above, is configured to determine a type of data storage access operation (read or write) and a data storage type (ephemeral or durable) requested to be accessed based on the data storage access request and perform the requested data storage access operation. The data storage access request, in the illustrative embodiment, includes a type of data storage access operation requested to be performed and a data storage type, which is to be accessed to perform the requested data storage access operation.

Figure 15:
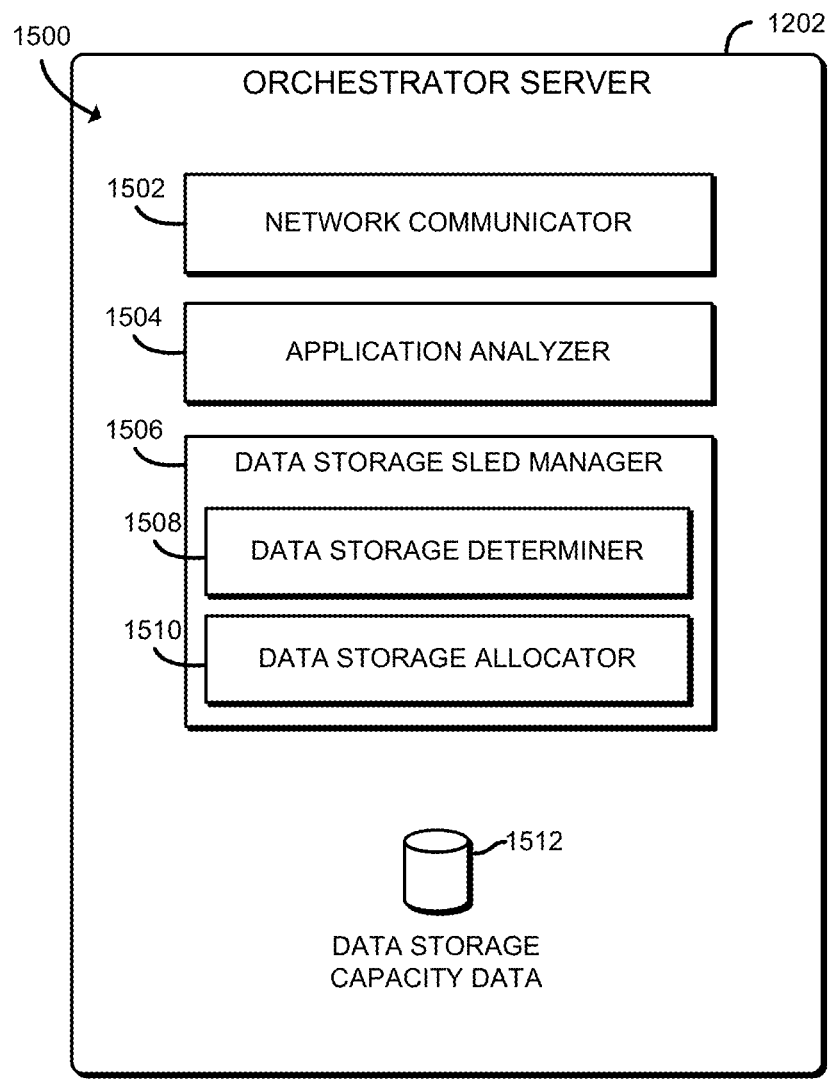
FIG. 15 is a simplified block diagram of at least one embodiment of an environment that may be established by an orchestrator server of FIG. 12.

Referring now to FIG. 15, in some embodiments, the orchestrator server 1202 may coordinate a data storage capacity allocation among multiple data storage sleds 1206. To do so, as described further below, the orchestrator server 1202 may determine a target storage resource allocation based on data storage requests and determine an amount of data storage capacity for each data storage type on each data storage sled 1206 based on the target storage resource allocation and availability of data storage capacity on each data storage sled 1206. In such embodiments, the orchestrator server 1202 may establish an environment 1500 during operation. The illustrative environment 1500 includes a network communicator 1502, an application analyzer 1504, and a data storage sled manager 1506. The data storage sled manager 1506 further includes a data storage determiner 1508 and a data storage allocator 1510. Each of the components of the environment 1500 may be embodied as hardware, firmware, software, or a combination thereof. As such, in some embodiments, one or more of the components of the environment 1500 may be embodied as circuitry or a collection of electrical devices (e.g., network communicator circuitry 1502, application analyzer circuitry 1504, data storage sled manager circuitry 1506, data storage determiner circuitry 1508, data storage allocator circuitry 1510, etc.). In the illustrative embodiment, the environment 1500 includes data storage capacity data 1512 which may be embodied as any data indicative of the availability of data storage capacity on one or more data storage sleds 1206 for different data storage types, such as amounts of available ephemeral data storage and durable data storage. As described above, the different types of data storage devices to provide the different types of ephemeral data storage may be solid state drives (SSDs), hard disk drives (HDDs), dual in-line memory modules, and/or other memory devices.

In the illustrative environment 1500, the network communicator 1502, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the orchestrator server 1202, respectively. To do so, the network communicator 1502 is configured to receive and process data packets from one system or computing device (e.g., the compute sleds 1204 or the data storage sleds 1206) and to prepare and send data packets to another computing device or system (e.g., the compute sleds 1204 or the data storage sleds 1206). Additionally, in the illustrative embodiment, the network communicator 1502 is configured to receive one or more storage requests from one or more applications 1242 that are to be executed by one or more compute sleds 1204 in the data center. Additionally, the network communicator 1502 is configured to receive storage sled data from each data storage sled 1206, which includes a present data storage capacity allocation on the corresponding data storage sled 1206.

The application analyzer 1504, which may be embodied as hardware, firmware, software, virtualized hardware, emulated architecture, and/or a combination thereof as discussed above, is configured to analyze the storage request(s) received from one or more applications 1242 that are executed by one or more compute sleds 1204 to determine a target storage resource allocation. For example, the storage request may include a service level agreement (SLA) that may indicate target quality of service (QoS) metrics associated with the corresponding application 1242 (e.g., a target resource utilization level, a target throughput and/or latency, a target reliability and capacity). Additionally, the application analyzer 1404 may determine a type of application 1242 to determine the amount of data storage capacity required for each of the data storage types to execute the corresponding application 1242. For example, the application or workload may include a set of instructions for performing a database function, a data compression or decompression function, a cryptographic function, and/or other functions that may affect the amount of data storage capacity required for different data storage types.

The data storage sled manager 1506, which may be embodied as hardware, firmware, software, virtualized hardware, emulated architecture, and/or a combination thereof as discussed above, is configured to manage allocation of data storage capacity for each of the plurality of different data storage types on each data storage sled 1206. To do so, the data storage sled manager 1506 further includes the data storage determiner 1508 and the data storage allocator 1510. The data storage determiner 1508, in the illustrative embodiment, is configured to determine data storage capacity available for each of the plurality of different data storage types on each data storage sled 1206 based on the storage sled data received from each data storage sled 1206 in the data center. The storage sled data may include any data indicative of the performance (e.g., read time, write time, seek time, bandwidth, input/output instructions per second, etc.) of the underlying data storage device 1262 that has the ephemeral data storage and durable data storage. Based on the data storage capacity available for each of the plurality of different data storage types on each data storage sled 1206, the data storage determiner 1508 is further to determine an amount of data storage capacity for each data storage type to be allocated to satisfy the target storage resource allocation.

The data storage allocator 1510, in the illustrative embodiment, is configured to transmit the data storage capacity allocation data to each of the data storage sleds 1206 indicating an amount of data storage capacity to be allocated to each data storage type on the corresponding data storage sled 1206. Additionally, the data storage allocator 1510 is further configured to assign multiple data storage sleds 1206 to provide durable data storage for one or more workloads 1242 such that the durable data storage is distributed across multiple points of failure (e.g., through replication and erasure coding). It should be noted that, as discussed above, each data storage sled 1206 represents a separate fault domain 1264 as shown in FIG. 12. The data storage allocator 1510, in operation, may then send a message back to the compute sled 1204 that sent the storage request with information about the allocated ephemeral data storage and durable data storage, including the amount of allocated storage for each data storage type, the addresses of the blocks of each data storage type, and the type (e.g., performance characteristics) of the allocated data storage type.

Figure 16:
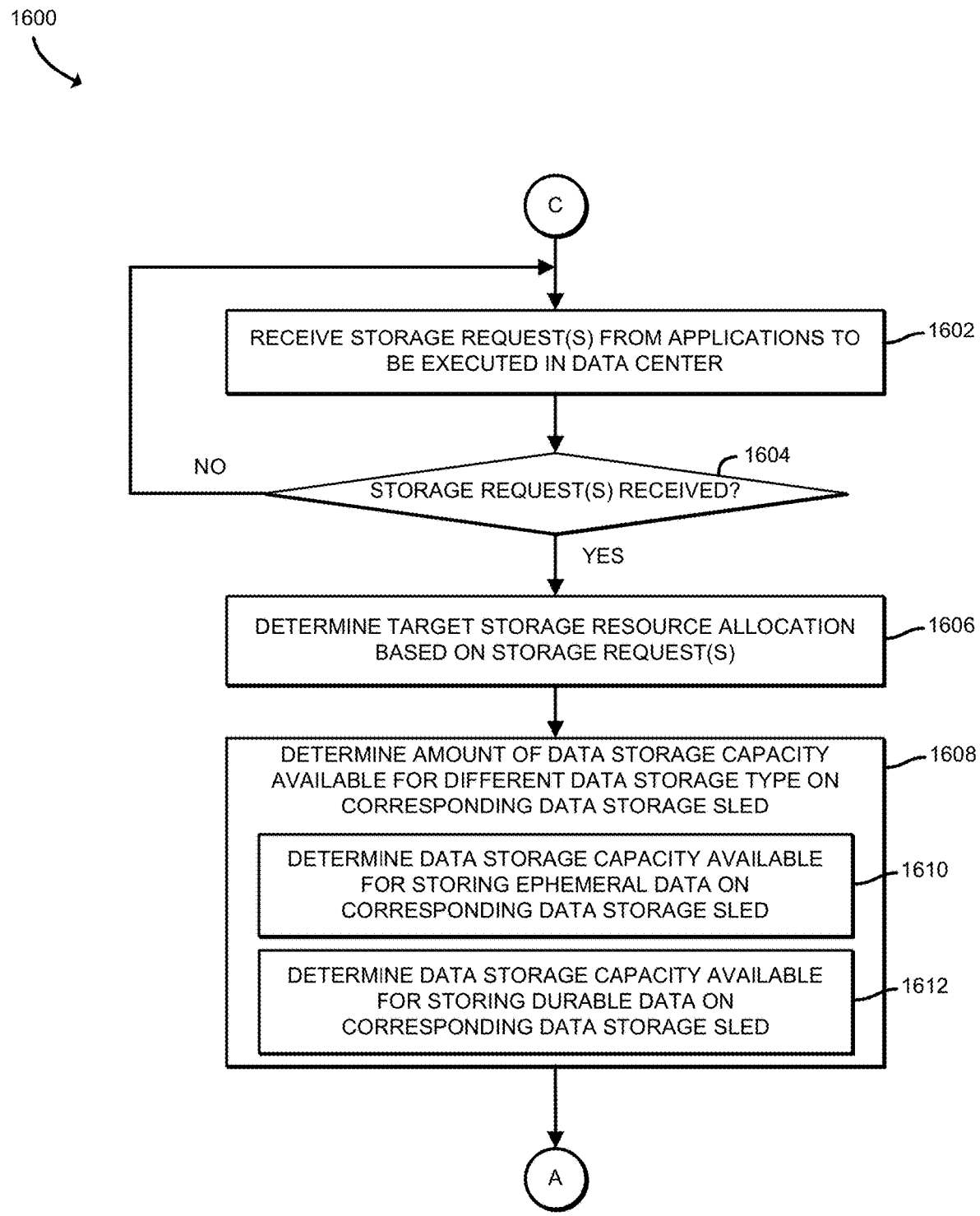
FIGS. 16-18 are a simplified flow diagram of at least one embodiment of a method for allocating data storage capacity for different data storage types that may be performed by the data storage sled of FIGS. 12-14.
Figure 17:
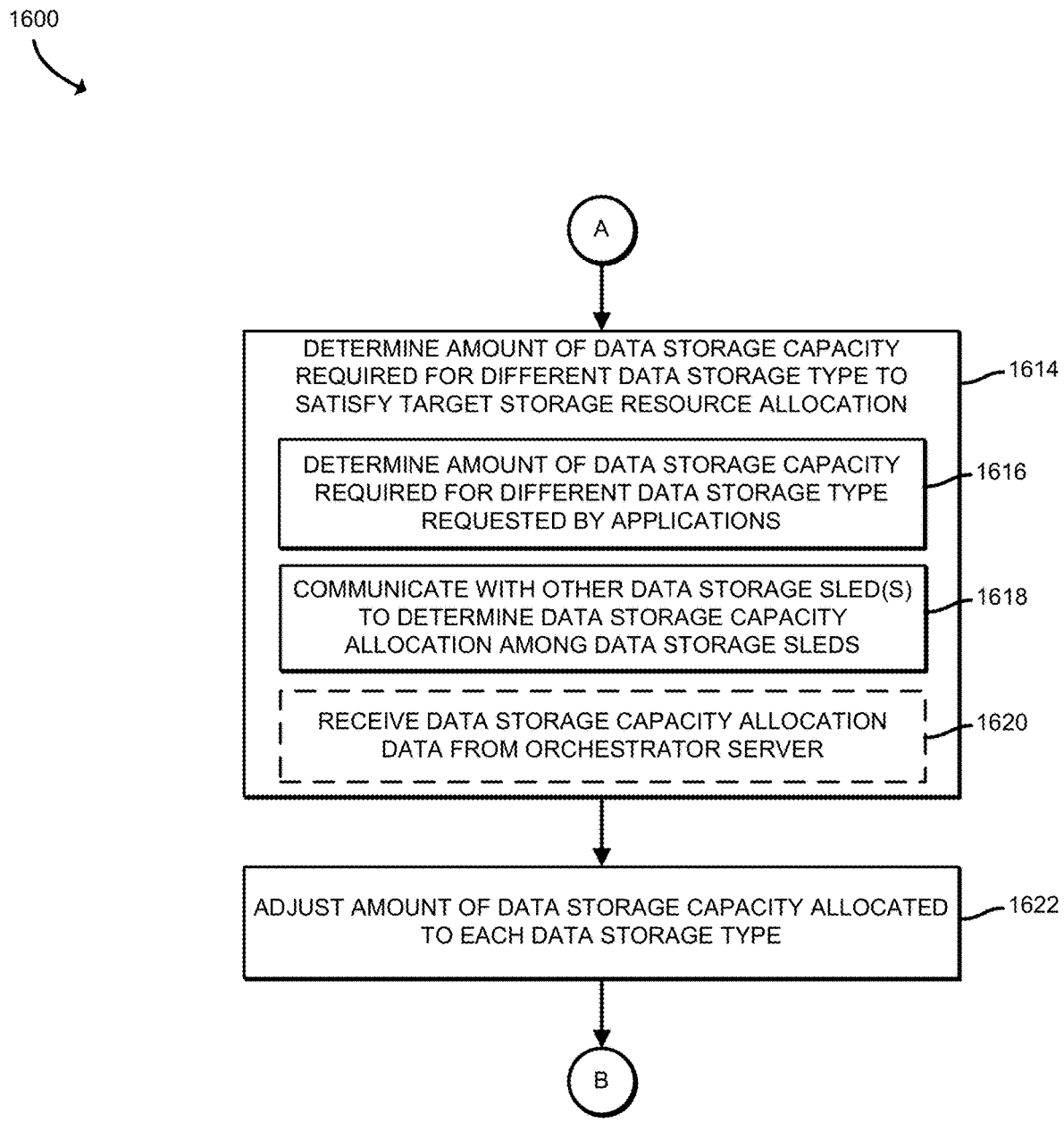
Figure 18:
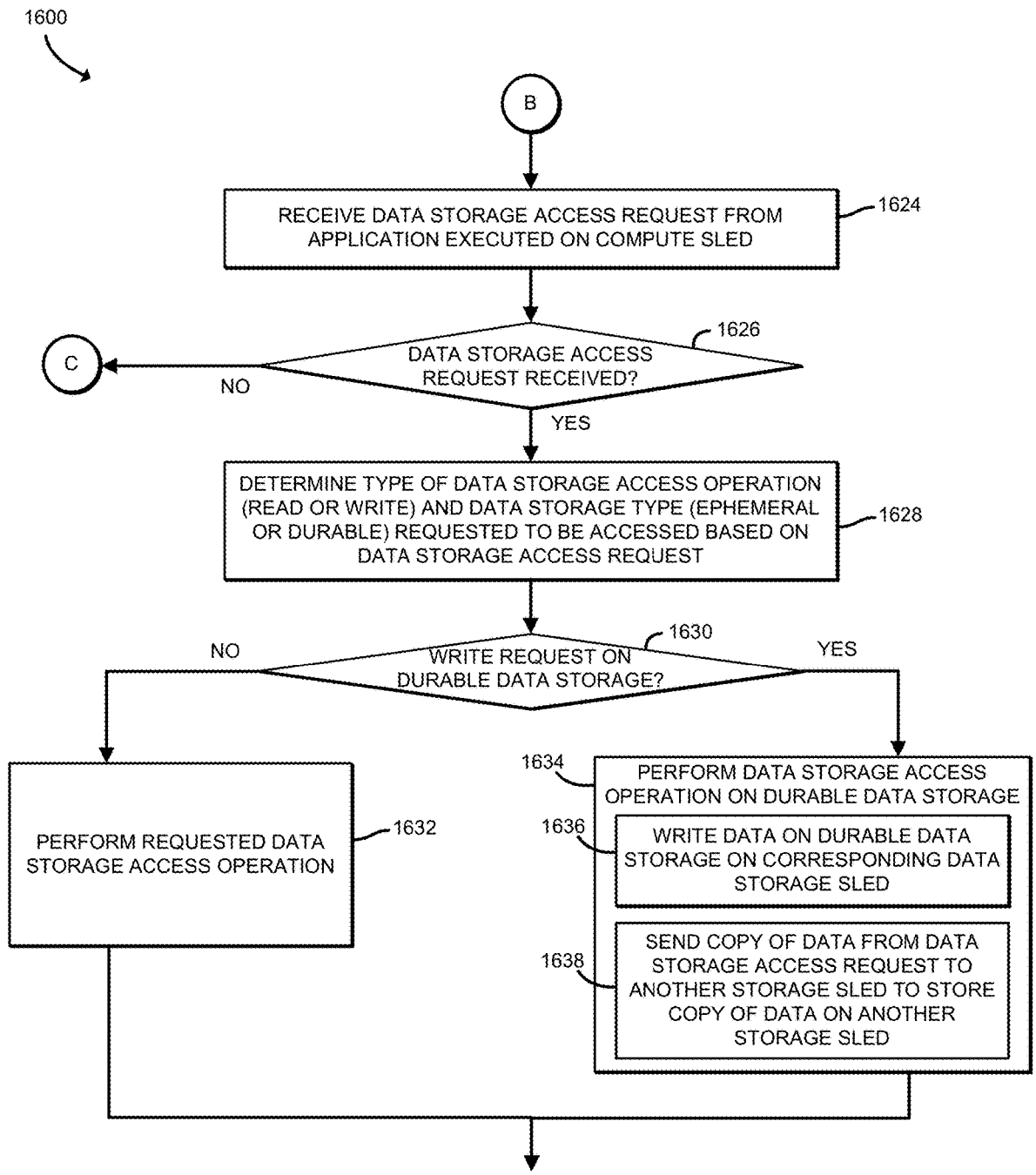

Referring now to FIGS. 16-18, in use, the data storage sled 1206 may execute a method 1600 for allocating data storage capacity for different data storage types. The method 1600 begins with block 1602, in which the data storage sled 1206 receives one or more storage requests from one or more applications 1242 that are configured to be executed by one or more compute sleds 1204 in a data center. If the data storage sled 1206 determines that at least one storage request has been received in block 1604, the method 1600 advances to block 1606. If, however, the data storage sled 1206 determines that a storage request has not been received in block 1604, the method 1600 loops back to block 1602 to await a storage request.

In block 1606, the data storage sled 1206 determines a target storage resource allocation based on the received storage request(s). For example, as discussed above, each storage request may include a service level agreement (SLA) that may indicate target quality of service (QoS) metrics associated with the corresponding application 1242 (e.g., a target utilization level, a target throughput and/or latency, a target reliability and capacity). As such, a change in one or more requirements of one or more applications 1242 to be executed by the compute sleds 1204 of the data center may affect the target storage resource allocation. Additionally, the data storage sled 1206 may determine a type of each application 1242 to determine an amount of data storage capacity required for each data storage type to execute the corresponding application 1242. For example, the application or workload may include a set of instructions for performing a database function, a data compression or decompression function, a cryptographic function, and/or other functions that may affect the amount of data storage capacity required for different data storage types.

In block 1608, the data storage sled 1206 further determines an amount of data storage capacity available for each of the data storage types on the corresponding data storage sled 1206. To do so, the data storage sled 1206 determines data storage capacity available for storing ephemeral data on the corresponding data storage sled 1206 as illustrated in block 1610. Additionally, the data storage sled 1206 further determines data storage capacity available for storing durable data on the corresponding data storage sled 1206 as illustrated in block 1612. In some embodiments, the data storage sled 1206 may determine the performance (e.g., read time, write time, seek time, bandwidth, input/output instructions per second, etc.) of the underlying data storage device 1262 to determine the amount of data storage capacity available for each of the data storage types.

Subsequently, in block 1614 shown in FIG. 17, the data storage sled 1206 determines an amount of data storage capacity required for each of the data storage types to satisfy the target storage resource allocation. To do so, in block 1616, the data storage sled 1206 determines an amount of data storage capacity required for each of the data storage types requested by the applications 1242 to be executed by one or more compute sleds 1204. In block 1618, the data storage sled 1206 communicates with other data storage sled(s) 1206 to determine data storage capacity allocation among the data storage sleds 1206 in the data center. As discussed above, each data storage sled 1206 represents a separate fault domain 1264, and the durable data is to be replicated across multiple data storage sleds 1206 to be distributed across multiple points of failure. As such, to maintain the integrity of the durable storage data, the data storage sled 1206 communicates with other data storage sled(s) 1206 to ensure that the durable data is distributed across multiple points of failure. Alternatively, in some embodiments, the data storage sled 1206 may receive data storage capacity allocation data from the orchestrator server 1202 as illustrated in block 1620. In such embodiments, the orchestrator server 1202 may coordinate the data storage capacity allocation among multiple data storage sleds 1206 as discussed above with reference to FIG. 15 and further discussed below. Accordingly, in response to the determination of the amount of data storage capacity to be allocated to each data storage type, the data storage sled 1206 adjusts the amount of data storage capacity allocated to each data storage type (e.g., ephemeral data storage and durable data storage) as illustrated in block 1622.

Subsequently, in block 1624, shown in FIG. 18, the data storage sled 1206 receives a data storage access request from an application executed on a compute sled 1204. If the data storage sled 1206 determines that a data storage access request has been received in block 1626, the method 1600 advances to block 1628. If, however, the data storage sled 1206 determines that a data storage access request has not been received in block 1626, the method 1600 loops back to block 1602 to await a storage request. In block 1628, the data storage sled 1206 determines a type of data storage access operation (e.g., read or write) and a data storage type (e.g., ephemeral or durable) requested to be accessed based on the data storage access request. As discussed above, the data storage access request includes a type of data storage access operation requested to be performed and a data storage type, which is to be accessed to perform the requested data storage access operation.

In block 1630, the data storage sled 1206 determines whether the data storage access request is a write request to be performed on durable data storage. If not, the method 1600 advances to block 1632, in which the data storage sled 1206 performs the requested data storage access operation (e.g., a read or write to ephemeral data storage, a read from durable data storage) based on the data storage access request. If, however, the data storage sled 1206 determines that the data storage access request is a write request of data on durable data storage, the method 1600 advances to block 1634. In block 1634, the data storage sled 1206 performs the data storage access operation to write the requested data on the durable data storage. To do so, the data storage sled 1206 writes the data on durable data storage on the corresponding data storage sled 1206 as illustrated in block 1636 and sends a copy of data from the data storage access request to another storage sled 1206 to store the copy of the data on another data storage sled 1206 as illustrated in block 1638.

Figure 19:
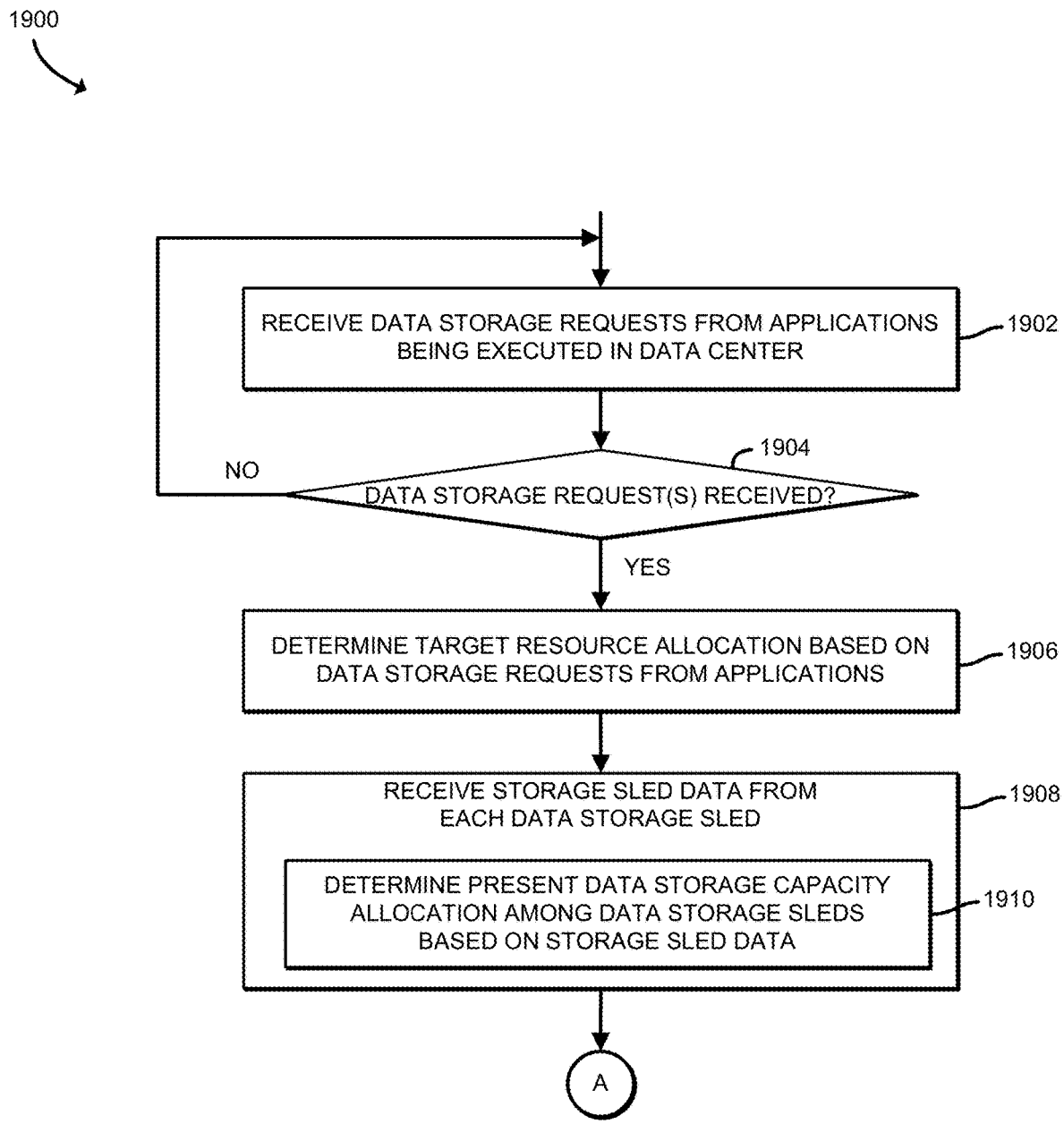
FIGS. 19 and 20 are a simplified flow diagram of at least one embodiment of a method for allocating data storage capacity for different data storage types that may be performed by the orchestrator server of FIGS. 12 and 15.
Figure 20:
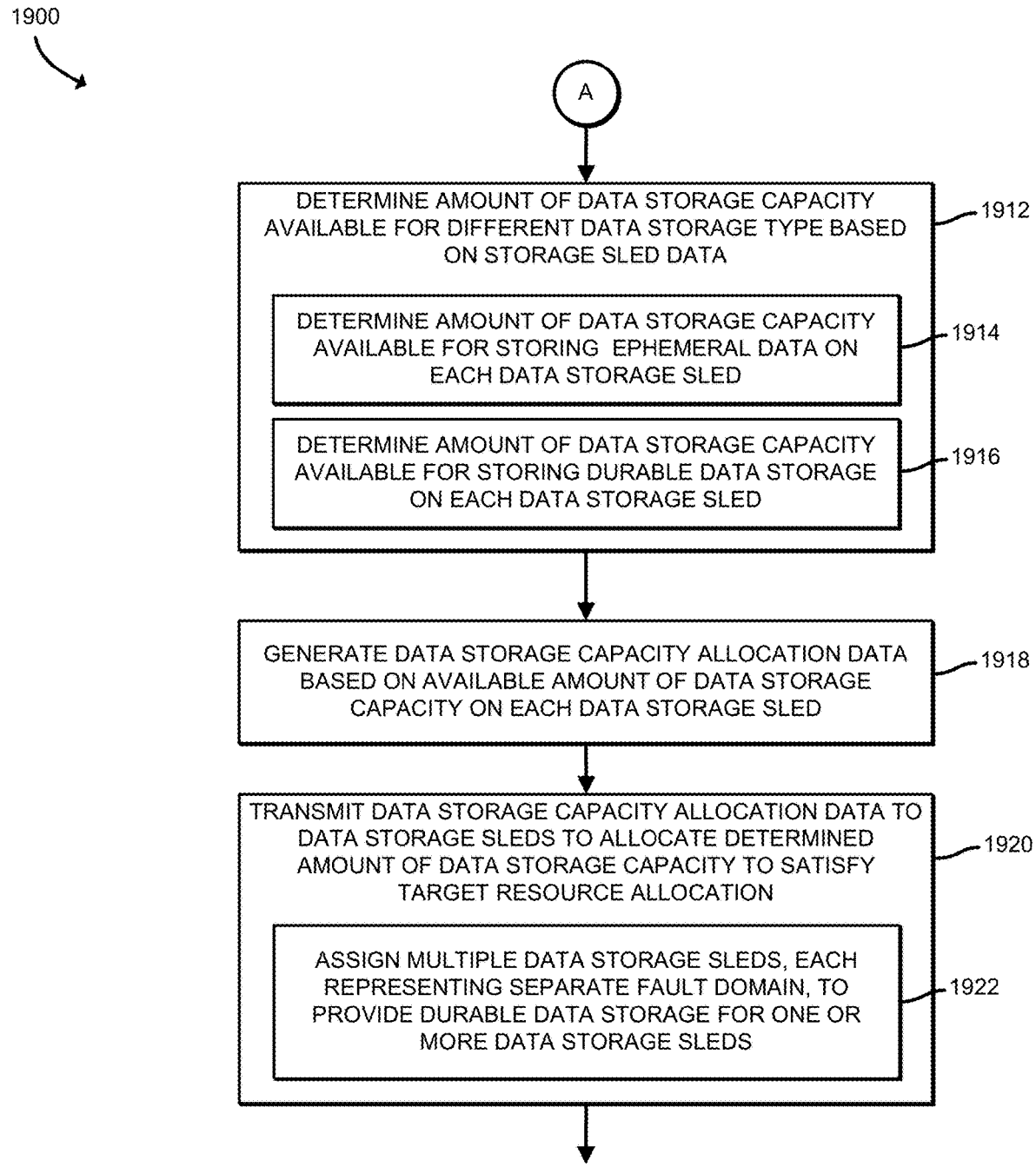

Referring now to FIGS. 19 and 20, in use in some embodiments, the orchestrator server 1202 may execute a method 1900 for allocating data storage capacity for different data storage types. The method 1900 begins with block 1902, in which the orchestrator server 1202 receives one or more storage requests from one or more applications that are configured to be executed by one or more compute sleds 1204 in a data center. If the orchestrator server 1202 determines that at least one storage request has been received in block 1904, the method 1900 advances to block 1906. If, however, the orchestrator server 1202 determines that a storage request has not been received in block 1904, the method 1900 loops back to block 1902 to await one or more storage requests.

In block 1906, the orchestrator server 1202 determines a target storage resource allocation based on the one or more storage requests. For example, as discussed above, the storage request may include a service level agreement (SLA) that may indicate target quality of service (QoS) metrics associated with the corresponding application 1242 (e.g., a target utilization level, a target throughput and/or latency, a target reliability and capacity). As such, a change in one or more requirements of one or more applications 1242 to be executed by the compute sleds 1204 of the data center may affect the target storage resource allocation. Additionally, the orchestrator server 1202 may determine a type of each application 1242 to determine an amount of data storage capacity required for each of the data storage types to execute the corresponding application 1242. For example, the application or workload may include a set of instructions for performing a database function, a data compression or decompression function, a cryptographic function, and/or other functions that may affect the amount of data storage capacity required for different data storage types.

In block 1908, the orchestrator server 1202 receives storage sled data from each data storage sled 1206. As discussed above, the storage sled data includes any data indicative of the performance (e.g., read time, write time, seek time, bandwidth, input/output instructions per second, etc.) of the underlying data storage device 1262 that may be used to determine an amount of data storage capacity available for each of the data storage types on each data storage sled 1206. It should be appreciated that the storage sled data includes a present data storage capacity allocation on each data storage sled 1206. As such, the orchestrator server 1202 determines a present data storage capacity allocation among the data storage sleds 1206 based on the storage sled data as illustrated in block 1910.

Subsequently, in block 1912 in FIG. 20, the orchestrator server 1202 determines an amount of data storage capacity available for each of the data storage types on each data storage sled 1206 based on the storage sled data received from the corresponding data storage sled 1206. To do so, the orchestrator server 1202 determines an amount of data storage capacity available for storing ephemeral data on each data storage sled 1206, as illustrated in block 1914. Additionally, the orchestrator server 1202 further determines an amount of data storage capacity available for storing durable data storage on each data storage sled 1206, as illustrated in block 1916.

In block 1918, the orchestrator server 1202 generates data storage capacity allocation data based on the available amount of data storage capacity on each data storage sled 1206. As discussed above, the data storage capacity allocation data is indicative of allocation of an amount of data storage capacity for each of the ephemeral and durable data storage on the corresponding data storage sled 1206 from the orchestrator server 1202. In block 1920, the orchestrator server 1202 transmits the data storage capacity allocation data to the data storage sleds 1206 such that each data storage sled 1206 allocates the determined amount of data storage capacity for each data storage type to satisfy the target storage resource allocation. To do so, the orchestrator server 1202 assigns multiple data storage sleds 1206 to provide durable data storage for one or more data storage sleds 1206 such that the durable data storage is distributed across multiple points of failure through replication and erasure coding.

EXAMPLES

Illustrative examples of the technologies disclosed herein are provided below. An embodiment of the technologies may include any one or more, and any combination of, the examples described below.

Example 1 includes a data storage sled for allocation of data storage capacity, the data storage sled comprising a plurality of data storage devices communicatively coupled to a plurality of network switches through a plurality of physical network connections; and a data storage controller connected to the plurality of data storage devices, wherein the data storage controller is to (i) determine a target storage resource allocation to be used by one or more applications to be executed by one or more sleds in a data center, (ii) determine data storage capacity available for each of a plurality of different data storage types on the data storage sled, wherein each data storage type is associated with a different level of data redundancy, (iii) determine an amount of data storage capacity for each data storage type to be allocated to satisfy the target storage resource allocation, and (iv) adjust the amount of data storage capacity allocated to each data storage type, wherein the different data storage types include ephemeral data storage and durable data storage.

Example 2 includes the subject matter of Example 1, and wherein to determine the target storage resource allocation comprises to receive one or more storage requests from the one or more applications; and determine, in response to receiving the one or more storage requests, a target storage resource allocation based on the one or more storage requests.

Example 3 includes the subject matter of any of Examples 1 and 2, and wherein the one or more storage requests received from one or more applications includes an amount of data storage capacity requested for storing ephemeral data.

Example 4 includes the subject matter of any of Examples 1-3, and wherein the one or more storage requests received from one or more applications includes an amount of data storage capacity requested for storing durable data.

Example 5 includes the subject matter of any of Examples 1-4, and wherein to determine the data storage capacity available for each of the plurality of different data storage types on the data storage sled comprises to determine data storage capacity available for storing ephemeral data on the data storage sled.

Example 6 includes the subject matter of any of Examples 1-5, and wherein to determine the data storage capacity available for each of the plurality of different data storage types on the data storage sled comprises to determine data storage capacity available for storing durable data on the data storage sled.

Example 7 includes the subject matter of any of Examples 1-6, and wherein to determine the amount of data storage capacity required for each of the plurality of different data storage types to satisfy the target storage resource allocation comprises to determine data storage capacity allocation among multiple data storage sleds in the data center.

Example 8 includes the subject matter of any of Examples 1-7, and wherein to determine the amount of data storage capacity required for each of the plurality of different data storage types to satisfy the target storage resource allocation comprises to communicate, by the data storage sled, with one or more other data storage sleds in the data center to determine data storage capacity allocation among the data storage sleds in the data center.

Example 9 includes the subject matter of any of Examples 1-8, and wherein to determine the amount of data storage capacity required for each of the plurality of different data storage types to satisfy the target storage resource allocation comprises to receive data storage capacity allocation data from an orchestrator server.

Example 10 includes the subject matter of any of Examples 1-9, and wherein the data storage controller is further to receive a data storage access request from an application executed on a compute sled of the one or more compute sleds in the data center; and determine, in response to a receipt of the data storage access request, a type of data storage access operation and a data storage type requested to be accessed based on the data storage access request; wherein the data storage access operation includes a read or write access operation.

Example 11 includes the subject matter of any of Examples 1-10, and wherein the data storage controller is further to perform, in response to a determination that the data storage access request is a write access operation request on the ephemeral data storage, the data storage access operation on the ephemeral data storage.

Example 12 includes the subject matter of any of Examples 1-11, and wherein the data storage controller is further to determine whether the data storage access request is a write access operation request on the durable data storage; and perform, in response to a determination that the data storage access request is a write access operation request on the durable data storage, the data storage access operation on the durable data storage.

Example 13 includes the subject matter of any of Examples 1-12, and wherein to perform the data storage access operation on the durable data storage comprises to write data on the durable data storage on the data storage sled; and send a copy of the data to another data storage sled in the data center to store the data on the another data storage sled to store a redundant copy of the data.

Example 14 includes the subject matter of any of Examples 1-13, and wherein the data storage sled defines a fault domain.

Example 15 includes a method for allocation of data storage capacity on a data storage sled, the method comprising determining, by the data storage sled, a target storage resource allocation to be used by one or more applications to be executed by one or more compute sleds in a data center; determining, by the data storage sled, data storage capacity available for each of a plurality of different data storage types on the data storage sled, wherein each data storage type is associated with a different level of data redundancy; determining, by the data storage sled, an amount of data storage capacity for each data storage type to be allocated to satisfy the target storage resource allocation; and adjusting, by the data storage sled, the amount of data storage capacity allocated to each data storage type; wherein the different data storage types include ephemeral data storage and durable data storage.

Example 16 includes the subject matter of Example 15, and wherein determining the target storage resource allocation comprises receiving, by the data storage sled, one or more storage requests from the one or more applications; and determining, in response to receiving the one or more storage requests and by the data storage sled, a target storage resource allocation based on the one or more storage requests.

Example 17 includes the subject matter of any of Examples 15 and 16, and wherein the one or more storage requests received from one or more applications includes an amount of data storage capacity requested for storing ephemeral data.

Example 18 includes the subject matter of any of Examples 15-17, and wherein the one or more storage requests received from one or more applications includes an amount of data storage capacity requested for storing durable data.

Example 19 includes the subject matter of any of Examples 15-18, and wherein determining the data storage capacity available for each of the plurality of different data storage types on the data storage sled comprises determining, by the data storage sled, data storage capacity available for storing ephemeral data on the data storage sled.

Example 20 includes the subject matter of any of Examples 15-19, and wherein determining the data storage capacity available for each of the plurality of different data storage types on the data storage sled comprises determining, by the data storage sled, data storage capacity available for storing durable data on the data storage sled.

Example 21 includes the subject matter of any of Examples 15-20, and wherein determining the amount of data storage capacity required for each of the plurality of different data storage types to satisfy the target storage resource allocation comprises determining, by the data storage sled, data storage capacity allocation among multiple data storage sleds in the data center.

Example 22 includes the subject matter of any of Examples 15-21, and wherein determining the amount of data storage capacity required for each of the plurality of different data storage types to satisfy the target storage resource allocation comprises communicating, by the data storage sled, with one or more other data storage sleds in the data center to determine data storage capacity allocation among the data storage sleds in the data center.

Example 23 includes the subject matter of any of Examples 15-22, and wherein determining the amount of data storage capacity required for each of the plurality of different data storage types to satisfy the target storage resource allocation comprises receiving, by the data storage sled, data storage capacity allocation data from an orchestrator server.

Example 24 includes the subject matter of any of Examples 15-23, and further including receiving, by the data storage sled, a data storage access request from an application executed on a compute sled of the one or more compute sleds in the data center; and determining, in response to a receipt of the data storage access request and by the data storage sled, a type of data storage access operation and a data storage type requested to be accessed based on the data storage access request; wherein the data storage access operation includes a read or write access operation.

Example 25 includes the subject matter of any of Examples 15-24, and further including performing, in response to a determination that the data storage access request is a write access operation request on the ephemeral data storage and by the data storage sled, the data storage access operation on the ephemeral data storage.

Example 26 includes the subject matter of any of Examples 15-25, and further including determining, by the data storage sled, whether the data storage access request is a write access operation request on the durable data storage; and performing, in response to a determination that the data storage access request is a write access operation request on the durable data storage and by the data storage sled, the data storage access operation on the durable data storage.

Example 27 includes the subject matter of any of Examples 15-26, and wherein performing the data storage access operation on the durable data storage comprises writing, by the data storage sled, data on the durable data storage on the data storage sled; and sending, by the data storage sled, a copy of the data to another data storage sled in the data center to store the data on the another data storage sled to store a redundant copy of the data.

Example 28 includes a data storage sled comprising means for performing the method of any of Examples 15-27.

Example 29 includes one or more machine-readable storage media comprising a plurality of instructions stored thereon that, in response to being executed, cause a data storage sled to perform the method of any of Examples 15-27.

Example 30 includes a data storage sled comprising a compute engine to perform the method of any of Examples 15-27.

Example 31 includes a data storage sled for allocation of data storage capacity, the data storage sled comprising means for determining a target storage resource allocation to be used by one or more applications to be executed by one or more compute sleds in a data center; means for determining data storage capacity available for each of a plurality of different data storage types on the data storage sled, wherein each data storage type is associated with a different level of data redundancy; means for determining an amount of data storage capacity for each data storage type to be allocated to satisfy the target storage resource allocation; and means for adjusting the amount of data storage capacity allocated to each data storage type; wherein the different data storage types include ephemeral data storage and durable data storage.

Example 32 includes the subject matter of Example 31, and wherein the means for determining the target storage resource allocation comprises means for receiving one or more storage requests from the one or more applications; and means for determining, in response to receiving the one or more storage requests, a target storage resource allocation based on the one or more storage requests.

Example 33 includes the subject matter of any of Examples 31 and 32, and wherein the one or more storage requests received from one or more applications includes an amount of data storage capacity requested for storing ephemeral data.

Example 34 includes the subject matter of any of Examples 31-33, and wherein the one or more storage requests received from one or more applications includes an amount of data storage capacity requested for storing durable data.

Example 35 includes the subject matter of any of Examples 31-34, and wherein the means for determining the data storage capacity available for each of the plurality of different data storage types on the data storage sled comprises means for determining data storage capacity available for storing ephemeral data on the data storage sled.

Example 36 includes the subject matter of any of Examples 31-35, and wherein the means for determining the data storage capacity available for each of the plurality of different data storage types on the data storage sled comprises means for determining data storage capacity available for storing durable data on the data storage sled.

Example 37 includes the subject matter of any of Examples 31-36, and wherein the means for determining the amount of data storage capacity required for each of the plurality of different data storage types to satisfy the target storage resource allocation comprises means for determining data storage capacity allocation among multiple data storage sleds in the data center.

Example 38 includes the subject matter of any of Examples 31-37, and wherein the means for determining the amount of data storage capacity required for each of the plurality of different data storage types to satisfy the target storage resource allocation comprises means for communicating with one or more other data storage sleds in the data center to determine data storage capacity allocation among the data storage sleds in the data center.

Example 39 includes the subject matter of any of Examples 31-38, and wherein the means for determining the amount of data storage capacity required for each of the plurality of different data storage types to satisfy the target storage resource allocation comprises means for receiving data storage capacity allocation data from an orchestrator server.

Example 40 includes the subject matter of any of Examples 31-39, and further including means for receiving a data storage access request from an application executed on a compute sled of the one or more compute sleds in the data center; and means for determining, in response to a receipt of the data storage access request, a type of data storage access operation and a data storage type requested to be accessed based on the data storage access request; wherein the data storage access operation includes a read or write access operation.

Example 41 includes the subject matter of any of Examples 31-40, and further including means for performing, in response to a determination that the data storage access request is a write access operation request on the ephemeral data storage, the data storage access operation on the ephemeral data storage.

Example 42 includes the subject matter of any of Examples 31-41, and further including means for determining whether the data storage access request is a write access operation request on the durable data storage; and means for performing, in response to a determination that the data storage access request is a write access operation request on the durable data storage, the data storage access operation on the durable data storage.

Example 43 includes the subject matter of any of Examples 31-42, and wherein the means for performing the data storage access operation on the durable data storage comprises means for writing data on the durable data storage on the data storage sled; and means for sending a copy of the data to another data storage sled in the data center to store the data on the another data storage sled to store a redundant copy of the data.

Example 44 includes an orchestrator server for managing data storage capacity allocation, the orchestrator server comprising a compute engine to receive one or more data storage requests from one or more applications executed in a data center; determine, in response to receipt of the one or more data storage requests, a target storage resource allocation among a plurality of data storage sleds based on the one or more data storage requests; receive storage sled data from each data storage sled; determine an amount of data storage capacity available for each of a plurality of different data storage types based on the storage sled data; and transmit data storage capacity allocation data to the plurality of data storage sleds to allocate the determined amount of data storage capacity to satisfy the target storage resource allocation; wherein the different data storage types include ephemeral data storage and durable data storage; and wherein the orchestrator server is communicatively coupled to the plurality of data storage sleds via a plurality of network switches through a plurality of physical network connections.

Example 45 includes the subject matter of Example 44, and wherein to determine the target storage resource allocation among a plurality of data storage sleds comprises to determine an amount of data storage capacity to be allocated for storing ephemeral data based on the one or more data storage requests.

Example 46 includes the subject matter of any of Examples 44 and 45, and wherein to determine the target storage resource allocation among a plurality of data storage sleds comprises to determine an amount of data storage capacity to be allocated for storing durable data based on the one or more data storage requests.

Example 47 includes the subject matter of any of Examples 44-46, and wherein to receive the storage sled data from each data storage sled comprises to receive a present data storage capacity allocation on each data storage sled.

Example 48 includes the subject matter of any of Examples 44-47, and wherein to determine the amount of data storage capacity available for each of the plurality of different data storage types based on the storage sled data comprises to determine an amount of data storage capacity available for storing ephemeral data on each data storage sled.

Example 49 includes the subject matter of any of Examples 44-48, and wherein to determine the amount of data storage capacity available for each of the plurality of different data storage types based on the storage sled data comprises to determine an amount of data storage capacity available for storing durable data on each data storage sled.

Example 50 includes the subject matter of any of Examples 44-49, and wherein to transmit data storage capacity allocation data comprises to assign multiple data storage sleds of the plurality of data storage sleds in the data center to provide a durable data storage as separate fault domains.

Example 51 includes a method for managing data storage capacity allocation, the method comprising receiving, by an orchestrator server, one or more data storage requests from one or more applications being executed in a data center; determining, in response to receiving the one or more data storage requests and by the orchestrator server, a target storage resource allocation among a plurality of data storage sleds based on the one or more data storage requests; receiving, by the orchestrator server, storage sled data from each data storage sled; determining, by the orchestrator server, an amount of data storage capacity available for each of a plurality of different data storage types based on the storage sled data; and transmitting, by the orchestrator server, data storage capacity allocation data to the plurality of data storage sleds to allocate the determined amount of data storage capacity to satisfy the target storage resource allocation; wherein the different data storage types include ephemeral data storage and durable data storage.

Example 52 includes the subject matter of Example 51, and wherein determining the target storage resource allocation among a plurality of data storage sleds comprises determining, by the orchestrator server, an amount of data storage capacity to be allocated for storing ephemeral data based on the one or more data storage requests.

Example 53 includes the subject matter of any of Examples 51 and 52, and wherein determining the target storage resource allocation among a plurality of data storage sleds comprises determining, by the orchestrator server, an amount of data storage capacity to be allocated for storing durable data based on the one or more data storage requests.

Example 54 includes the subject matter of any of Examples 51-53, and wherein receiving the storage sled data from each data storage sled comprises receiving, by the orchestrator server, a present data storage capacity allocation on each data storage sled.

Example 55 includes the subject matter of any of Examples 51-54, and wherein determining the amount of data storage capacity available for each of the plurality of different data storage types based on the storage sled data comprises determining, by the orchestrator server, an amount of data storage capacity available for storing ephemeral data on each data storage sled.

Example 56 includes the subject matter of any of Examples 51-55, and wherein determining the amount of data storage capacity available for each of the plurality of different data storage types based on the storage sled data comprises determining, by the orchestrator server, an amount of data storage capacity available for storing durable data on each data storage sled.

Example 57 includes the subject matter of any of Examples 51-56, and wherein transmitting data storage capacity allocation data comprises assigning, by the orchestrator server, multiple data storage sleds of the plurality of data storage sleds in the data to provide durable data storage as separate fault domains.

Example 58 includes a compute device comprising means for performing the method of any of Examples 51-57.

Example 59 includes one or more machine-readable storage media comprising a plurality of instructions stored thereon that, in response to being executed, cause a compute device to perform the method of any of Examples 51-57.

Example 60 includes a compute device comprising a compute engine to perform the method of any of Examples 51-57.

Example 61 includes an orchestrator server for managing data storage capacity allocation, the orchestrator server comprising means for receiving one or more data storage requests from one or more applications being executed in a data center; means for determining, in response to receiving the one or more data storage requests, a target storage resource allocation among a plurality of data storage sleds based on the one or more data storage requests; means for receiving storage sled data from each data storage sled; means for determining an amount of data storage capacity available for each of a plurality of different data storage types based on the storage sled data; and means for transmitting data storage capacity allocation data to the plurality of data storage sleds to allocate the determined amount of data storage capacity to satisfy the target storage resource allocation; wherein the different data storage types include ephemeral data storage and durable data storage.

Example 62 includes the subject matter of Example 61, and wherein the means for determining the target storage resource allocation among a plurality of data storage sleds comprises means for determining an amount of data storage capacity to be allocated for storing ephemeral data based on the one or more data storage requests.

Example 63 includes the subject matter of any of Examples 61 and 62, and wherein the means for determining the target storage resource allocation among a plurality of data storage sleds comprises means for determining an amount of data storage capacity to be allocated for storing durable data based on the one or more data storage requests.

Example 64 includes the subject matter of any of Examples 61-63, and wherein the means for receiving the storage sled data from each data storage sled comprises means for receiving a present data storage capacity allocation on each data storage sled.

Example 65 includes the subject matter of any of Examples 61-64, and wherein the means for determining the amount of data storage capacity available for each of the plurality of different data storage types based on the storage sled data comprises means for determining an amount of data storage capacity available for storing ephemeral data on each data storage sled.

Example 66 includes the subject matter of any of Examples 61-65, and wherein the means for determining the amount of data storage capacity available for each of the plurality of different data storage types based on the storage sled data comprises means for determining an amount of data storage capacity available for storing durable data on each data storage sled.

Example 67 includes the subject matter of any of Examples 61-66, and wherein the means for transmitting data storage capacity allocation data comprises means for assigning multiple data storage sleds of the plurality of data storage sleds in the data to provide durable data storage as separate fault domains.

The invention claimed is:
1. A data storage sled for allocation of data storage capacity, the data storage sled comprising:
   a plurality of data storage devices communicatively coupled to a plurality of network switches through a plurality of physical network connections; and
   a data storage controller connected to the plurality of data storage devices, wherein the data storage controller is to: (i) determine a target storage resource allocation to be used by one or more applications to be executed by one or more sleds in a data center, (ii) determine data storage capacity available for each of a plurality of different data storage types on the data storage sled, wherein each data storage type is associated with a different level of data redundancy, (iii) determine an amount of data storage capacity for each data storage type to be allocated to satisfy the target storage resource allocation, and (iv) adjust the amount of data storage capacity allocated to each data storage type, wherein the different data storage types include ephemeral data storage and durable data storage.

2. The data storage sled of claim 1, wherein to determine the target storage resource allocation comprises to:
   receive one or more storage requests from the one or more applications; and
   determine, in response to receiving the one or more storage requests, a target storage resource allocation based on the one or more storage requests.

3. The data storage sled of claim 2, wherein the one or more storage requests received from one or more applications includes an amount of data storage capacity requested for storing ephemeral data.

4. The data storage sled of claim 2, wherein the one or more storage requests received from one or more applications includes an amount of data storage capacity requested for storing durable data.

5. The data storage sled of claim 1, wherein to determine the data storage capacity available for each of the plurality of different data storage types on the data storage sled comprises to determine data storage capacity available for storing ephemeral data on the data storage sled.

6. The data storage sled of claim 1, wherein to determine the data storage capacity available for each of the plurality of different data storage types on the data storage sled comprises to determine data storage capacity available for storing durable data on the data storage sled.

7. The data storage sled of claim 1, wherein to determine the amount of data storage capacity required for each of the plurality of different data storage types to satisfy the target storage resource allocation comprises to determine data storage capacity allocation among multiple data storage sleds in the data center.

8. The data storage sled of claim 1, wherein to determine the amount of data storage capacity required for each of the plurality of different data storage types to satisfy the target storage resource allocation comprises to communicate, by the data storage sled, with one or more other data storage sleds in the data center to determine data storage capacity allocation among the data storage sleds in the data center.

9. The data storage sled of claim 1, wherein to determine the amount of data storage capacity required for each of the plurality of different data storage types to satisfy the target storage resource allocation comprises to receive data storage capacity allocation data from an orchestrator server.

10. The data storage sled of claim 1, wherein the data storage controller is further to:
receive a data storage access request from an application executed on a compute sled of the one or more compute sleds in the data center; and
determine, in response to a receipt of the data storage access request, a type of data storage access operation and a data storage type requested to be accessed based on the data storage access request;
wherein the data storage access operation includes a read or write access operation.

11. The data storage sled of claim 10, wherein the data storage controller is further to:
determine whether the data storage access request is a write access operation request on the durable data storage; and
perform, in response to a determination that the data storage access request is a write access operation request on the durable data storage, the data storage access operation on the durable data storage.

12. The data storage sled of claim 11, wherein to perform the data storage access operation on the durable data storage comprises to:
write data on the durable data storage on the data storage sled; and
send a copy of the data to another data storage sled in the data center to store the data on the another data storage sled to store a redundant copy of the data.

13. One or more non-transitory, machine-readable storage media comprising a plurality of instructions stored thereon that, in response to being executed, cause a data storage sled to:
determine a target storage resource allocation to be used by one or more applications to be executed by one or more compute sleds in a data center;
determine data storage capacity available for each of a plurality of different data storage types on the data storage sled, wherein each data storage type is associated with a different level of data redundancy;
determine an amount of data storage capacity for each data storage type to be allocated to satisfy the target storage resource allocation; and
adjust the amount of data storage capacity allocated to each data storage type;
wherein the different data storage types include ephemeral data storage and durable data storage.

14. The one or more non-transitory, machine-readable storage media of claim 13, wherein to determine the target storage resource allocation comprises to:
receive one or more storage requests from the one or more applications; and
determine, in response to receiving the one or more storage requests, a target storage resource allocation based on the one or more storage requests.

15. The one or more non-transitory, machine-readable storage media of claim 13, wherein to determine the data storage capacity available for each of the plurality of different data storage types on the data storage sled comprises to determine data storage capacity available for storing ephemeral data on the data storage sled.

16. The one or more non-transitory, machine-readable storage media of claim 13, wherein to determine the data storage capacity available for each of the plurality of different data storage types on the data storage sled comprises to determine data storage capacity available for storing durable data on the data storage sled.

17. The one or more non-transitory, machine-readable storage media of claim 13, wherein to determine the amount of data storage capacity required for each of the plurality of different data storage types to satisfy the target storage resource allocation comprises to determine data storage capacity allocation among multiple data storage sleds in the data center.

18. The one or more non-transitory, machine-readable storage media of claim 13, wherein to determine the amount of data storage capacity required for each of the plurality of different data storage types to satisfy the target storage resource allocation comprises to communicate with one or more other data storage sleds in the data center to determine data storage capacity allocation among the data storage sleds in the data center.

19. The one or more non-transitory, machine-readable storage media of claim 13, wherein to determine the amount of data storage capacity required for each of the plurality of different data storage types to satisfy the target storage resource allocation comprises to receive data storage capacity allocation data from an orchestrator server.

20. The one or more non-transitory, machine-readable storage media of claim 13, further comprising a plurality of instructions that in response to being executed cause the data storage sled to:
receive a data storage access request from an application executed on a compute sled of the one or more compute sleds in the data center; and
determine, in response to a receipt of the data storage access request, a type of data storage access operation and a data storage type requested to be accessed based on the data storage access request;
wherein the data storage access operation includes a read or write access operation.

21. The one or more non-transitory, machine-readable storage media of claim 20, further comprising a plurality of instructions that in response to being executed cause the data storage sled to perform, in response to a determination that the data storage access request is a write access operation request on the ephemeral data storage, the data storage access operation on the ephemeral data storage.

22. The one or more non-transitory, machine-readable storage media of claim 20, further comprising a plurality of instructions that in response to being executed cause the data storage sled to:
   determine whether the data storage access request is a write access operation request on the durable data storage; and
   perform, in response to a determination that the data storage access request is a write access operation request on the durable data storage, the data storage access operation on the durable data storage.

23. The one or more non-transitory, machine-readable storage media of claim 22, wherein performing the data storage access operation on the durable data storage comprises to:
   write data on the durable data storage on the data storage sled; and
   send a copy of the data to another data storage sled in the data center to store the data on the another data storage sled to store a redundant copy of the data.

24. A method for allocation of data storage capacity on a data storage sled, the method comprising:
   determining, by the data storage sled, a target storage resource allocation to be used by one or more applications to be executed by one or more compute sleds in a data center;
   determining, by the data storage sled, data storage capacity available for each of a plurality of different data storage types on the data storage sled, wherein each data storage type is associated with a different level of data redundancy;
   determining, by the data storage sled, an amount of data storage capacity for each data storage type to be allocated to satisfy the target storage resource allocation; and
   adjusting, by the data storage sled, the amount of data storage capacity allocated to each data storage type;
   wherein the different data storage types include ephemeral data storage and durable data storage.

25. The method of claim 24, wherein determining the target storage resource allocation comprises:
   receiving, by the data storage sled, one or more storage requests from the one or more applications; and
   determining, in response to receiving the one or more storage requests and by the data storage sled, a target storage resource allocation based on the one or more storage requests.

* * * * *